(12) United States Patent
Oviedo et al.

(10) Patent No.: US 12,114,325 B2
(45) Date of Patent: Oct. 8, 2024

(54) NEW RADIO (NR) TIME-DOMAIN RESOURCE ALLOCATION FOR CONFIGURED GRANT TRANSMISSIONS IN NR SYSTEMS OPERATING ON UNLICENSED SPECTRUM

(71) Applicant: APPLE INC., Cupertino, CA (US)

(72) Inventors: Jose Armando Oviedo, Cupertino, CA (US); Salvatore Talarico, Cupertino, CA (US); Yingyang Li, Cupertino, CA (US); Yongjun Kwak, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 401 days.

(21) Appl. No.: 17/606,570

(22) PCT Filed: May 4, 2020

(86) PCT No.: PCT/US2020/031327
§ 371 (c)(1),
(2) Date: Oct. 26, 2021

(87) PCT Pub. No.: WO2020/227218
PCT Pub. Date: Nov. 12, 2020

(65) Prior Publication Data
US 2022/0217763 A1   Jul. 7, 2022

Related U.S. Application Data

(60) Provisional application No. 62/842,977, filed on May 3, 2019.

(51) Int. Cl.
*H04W 72/23* (2023.01)
*H04W 16/14* (2009.01)
*H04W 74/0808* (2024.01)

(52) U.S. Cl.
CPC .......... *H04W 72/23* (2023.01); *H04W 16/14* (2013.01); *H04W 74/0808* (2013.01)

(58) Field of Classification Search
CPC .. H04W 72/23; H04W 16/14; H04W 74/0808
See application file for complete search history.

(56) References Cited

U.S. PATENT DOCUMENTS

2018/0302203 A1   10/2018  Kim
2019/0357190 A1   11/2019  Park
(Continued)

FOREIGN PATENT DOCUMENTS

WO      2016081375 A1    5/2016

OTHER PUBLICATIONS

PCT Search Report dated Jul. 30, 2020 in connection with PCT Application No. PCT/US2020/031327.
(Continued)

*Primary Examiner* — Hashim S Bhatti
(74) *Attorney, Agent, or Firm* — Eschweiler & Potashnik, LLC

(57) ABSTRACT

Techniques discussed herein can facilitate determine of Uplink (UL) resources for New Radio (NR) operation in unlicensed spectrum (NR-U). One example embodiment is an apparatus employable by a UE comprising one or more processors configured to: process at least one bitmap via Radio Resource Control (RRC) signaling, wherein each bitmap of the at least one bitmap comprises X bits, wherein X is an integer greater than one; and determine, based at least on the at least one bitmap, for each time resource of at least one Configured Grant (CG) period, whether that time resource is configured for Uplink (UL) transmission via an unlicensed carrier, wherein each CG period of the at least one CG period comprises P time resources, wherein P is an integer greater than one.

20 Claims, 9 Drawing Sheets

(56) References Cited

U.S. PATENT DOCUMENTS

2020/0229227 A1\* 7/2020 Babaei ................. H04W 76/11
2020/0260486 A1\* 8/2020 Zhou .................... H04L 1/1819
2020/0314889 A1\* 10/2020 Cirik .................... H04W 72/23
2020/0359409 A1\* 11/2020 Karaki ............. H04W 72/0446

OTHER PUBLICATIONS

PCT Written Opinion dated Jul. 30, 2020 in connection with PCT Application No. PCT/US2020/031327.
Huawei et al; Transmission with configured grant in NR unlicensed band; 3GPP Draft; R1-1903931; vol. Ran WG1; Apr. 7, 2019; URL:http://www.3gppp.org/ftp/Meetings%5F3GPP%5FSYNC/RAN1/Docs/R1%2D1903931%2Ezip.
NTT Docomo et al; "Summary of 7.2.6.3 Enhanced configured grant PUSCH transmissions"; 3GPP Draft; R1-1903585; vol. RAN WG1; Feb. 27, 2019; URL:http://www.3gpp.org/ftp/tsg%5Fran/WG1%5FRL1/TSGR1%5F96/Docs/R1%2D1903585%2Ezip.
Ericsson; "Configured UL Grant for NR-U"; 3GPP Draft; R1-1902886; vol. RAN WG1; Feb. 16, 2019; URL:http://www.3gpp.org/ftp/tsg%5Fran/WG1%5FRL1/TSGR1%5F96/Docs/R1%2D1902886%2Ezip.
3rd Generation Partnership Project; Technical Specification Group Radio Access Network; Study on NR-based access to unlicensed spectrum; (Release 16); 3GPP TR 38.889 V16.0.0; Dec. 2018.

\* cited by examiner

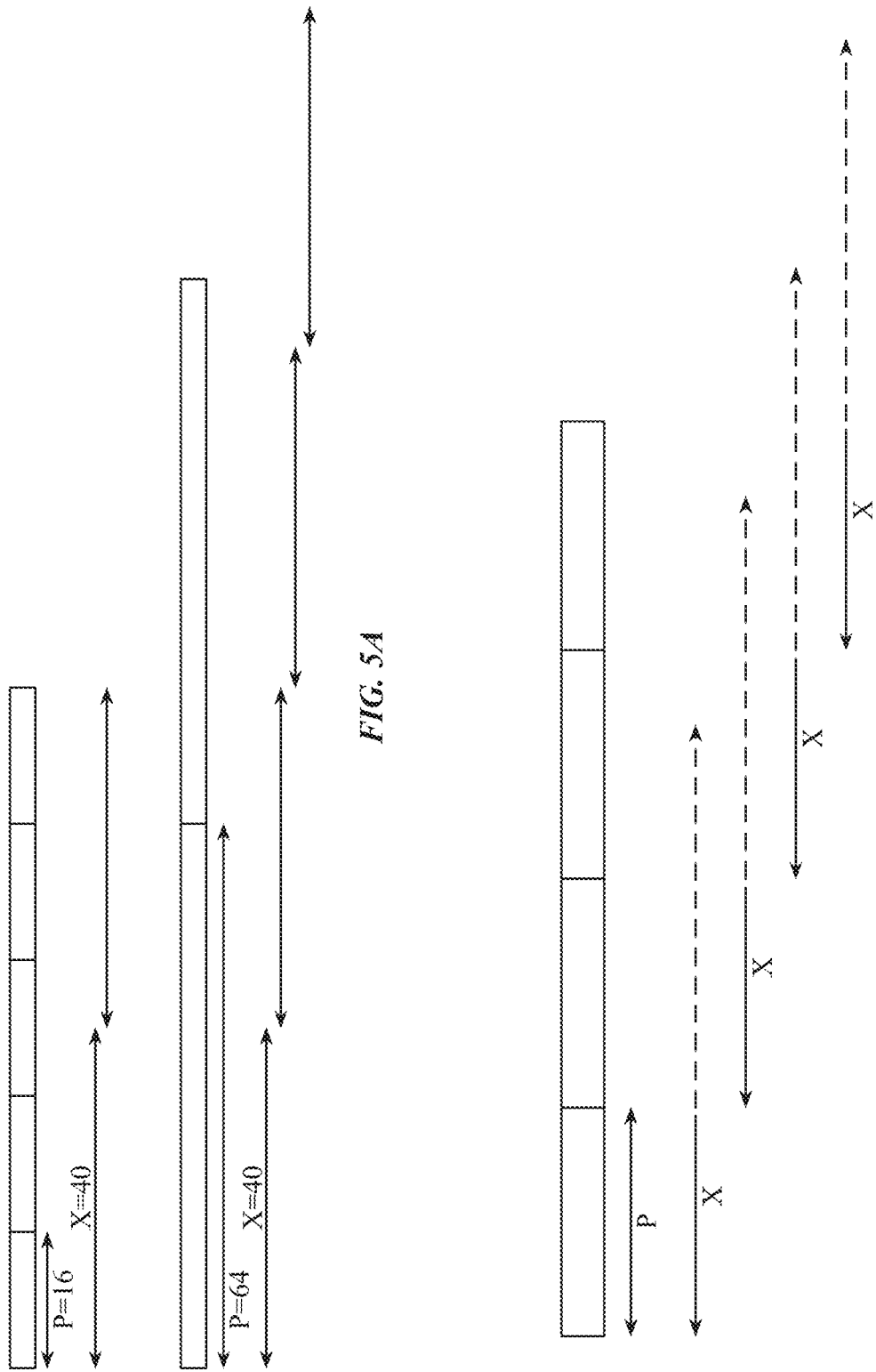

NEW RADIO (NR) TIME-DOMAIN RESOURCE ALLOCATION FOR CONFIGURED GRANT TRANSMISSIONS IN NR SYSTEMS OPERATING ON UNLICENSED SPECTRUM

CROSS REFERENCE TO RELATED APPLICATIONS

This application is a National Phase entry application of International Patent Application No. PCT/US2020/031327 filed May 4, 2020, which claims priority to U.S. Provisional Patent Application No. 62/842,977 filed on May 3, 2019, entitled "NR TIME-DOMAIN RESOURCE ALLOCATION FOR CONFIGURED GRANT TRANSMISSIONS IN NR SYSTEMS OPERATING ON UNLICENSED SPECTRUM," which is incorporated herein by reference for all purposes.

BACKGROUND

Each year, the number of mobile devices connected to wireless networks significantly increases. In order to keep up with the demand in mobile data traffic, changes are made to system requirements and capabilities to be able to meet these demands. Three areas targeted for enhancement in order to deliver this increase in traffic are larger bandwidth, lower latency, and higher data rates.

One of the major limiting factors in wireless communication is the availability in spectrum. To mitigate this, the unlicensed spectrum has been an area of interest to expand the availability of Third Generation Partnership Project (3GPP) Long Term Evolution (LTE). In this context, one of the major enhancements for LTE in 3GPP Release 13 (Rel-13) was to enable its operation in the unlicensed spectrum via Licensed-Assisted Access (LAA), which expands the system bandwidth by utilizing the flexible carrier aggregation (CA) framework introduced by the LTE-Advanced (LTE-A) system.

BRIEF DESCRIPTION OF THE DRAWINGS

FIG. 5A is a pair of diagrams illustrating examples of a bitmap (of example length X=40) that can be repeated over time independently of a Configured Grant (CG) periodicity (e.g., of 16 (top diagram) or 64 (bottom diagram)), according to various embodiments discussed herein.

FIG. 5B is a diagram illustrating an example of a bitmap (of example length X=40) wherein for a CG periodicity P<X, the P time-domain resource elements of each CG period can be configured based on the first P elements of the bitmap of length X, according to various embodiments discussed herein.

DETAILED DESCRIPTION

Figure 1:
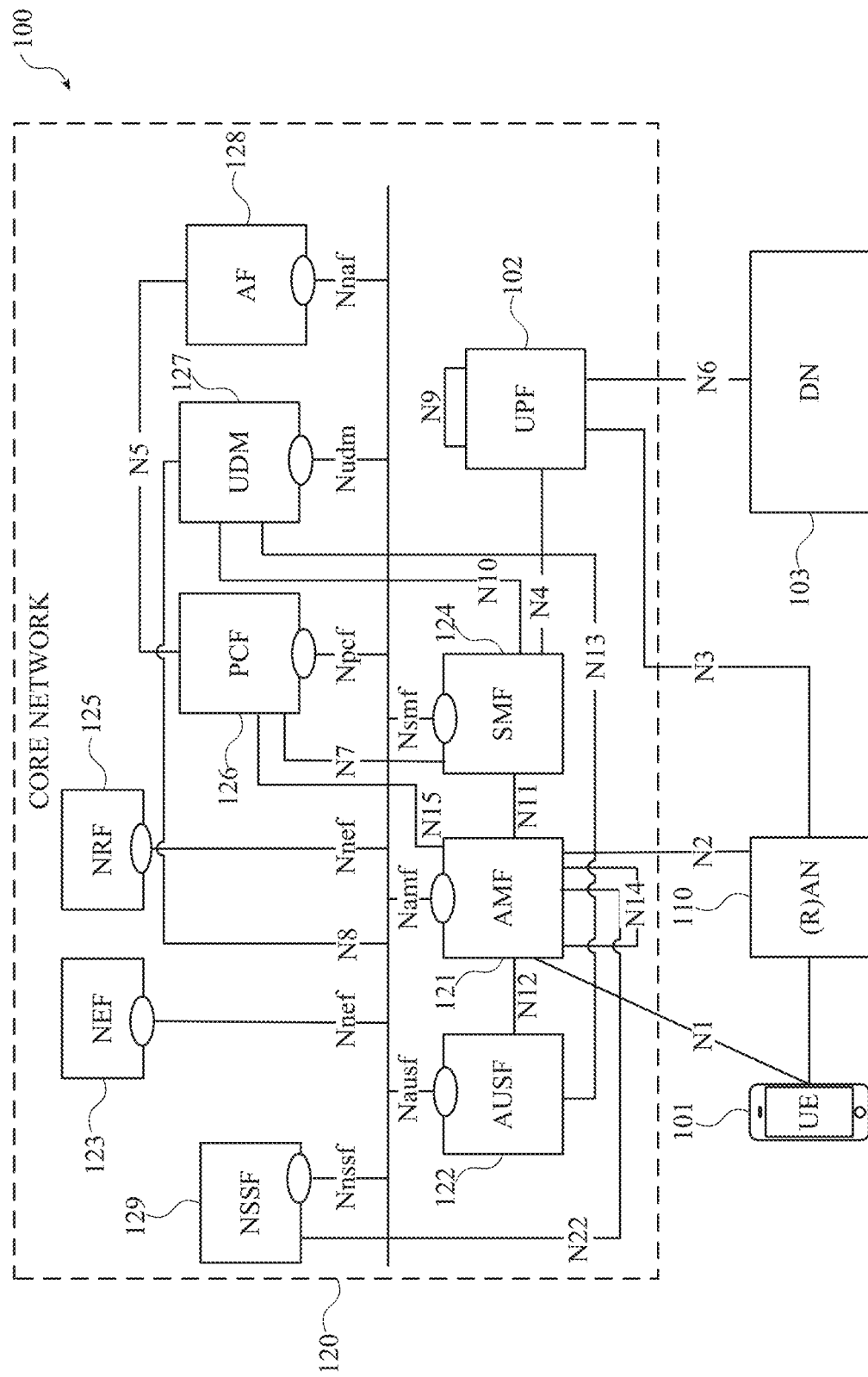
FIG. 1 is a block diagram illustrating an architecture of a system including a Core Network (CN), for example a Fifth Generation (5G) CN (5GC), in accordance with various embodiments.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone or other device configured to communicate via a 3GPP RAN, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more," unless the context indicates otherwise (e.g., "the empty set," "a set of two or more Xs," etc.).

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context may indicate that they are distinct or that they are the same.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

Various aspects discussed herein can relate to facilitating wireless communication, and the nature of these communications can vary.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments described herein can be implemented into a system using any suitably configured hardware and/or software. FIG. 1 illustrates an architecture of a system 100 including a Core Network (CN) 120, first through twenty-fourth additional examples for example a Fifth Generation (5G) CN (5GC), in accordance with various embodiments. The system 100 is shown to include a UE 101, which can be the same or similar to one or more other UEs discussed herein; a Third Generation Partnership Project (3GPP) Radio Access Network (Radio AN or RAN) or other (e.g., non-3GPP) AN, (R)AN 210, which can include one or more RAN nodes such as a base station (e.g., Evolved Node B(s) (eNB(s)), next generation Node B(s) (gNB(s)), and/or other nodes) or other nodes or access points; and a Data Network (DN) 203, which can be, for example, operator services, Internet access or third party services; and a Fifth Generation Core Network (5GC) 120. The 5GC 120 can comprise one or more of the following functions and network components: an Authentication Server Function (AUSF) 122; an Access and Mobility Management Function (AMF) 121; a Session Management Function (SMF) 124; a Network Exposure Function (NEF) 123; a Policy Control Function (PCF) 126; a Network Repository Function (NRF) 125; a Unified Data Management (UDM) 127; an Application Function (AF) 128; a User Plane (UP) Function (UPF) 102; and a Network Slice Selection Function (NSSF) 129.

The UPF 102 can act as an anchor point for intra-RAT and inter-RAT mobility, an external Protocol Data Unit (PDU) session point of interconnect to DN 103, and a branching point to support multi-homed PDU session. The UPF 102 can also perform packet routing and forwarding, perform packet inspection, enforce the user plane part of policy rules, lawfully intercept packets (UP collection), perform traffic usage reporting, perform QoS handling for a user plane (e.g., packet filtering, gating, Uplink (UL)/Downlink (DL) rate enforcement), perform Uplink Traffic verification (e.g., Service Data Flow (SDF) to QoS flow mapping), transport level packet marking in the uplink and downlink, and perform downlink packet buffering and downlink data notification triggering. UPF 102 can include an uplink classifier to support routing traffic flows to a data network. The DN 103 can represent various network operator services, Internet access, or third-party services. DN 103 can include, or be similar to, an application server. The UPF 102 can interact with the SMF 124 via an N4 reference point between the SMF 124 and the UPF 102.

The AUSF 122 can store data for authentication of UE 101 and handle authentication-related functionality. The AUSF 122 can facilitate a common authentication framework for various access types. The AUSF 122 can communicate with the AMF 121 via an N12 reference point between the AMF 121 and the AUSF 122; and can communicate with the UDM 127 via an N13 reference point between the UDM 127 and the AUSF 122. Additionally, the AUSF 122 can exhibit an Nausf service-based interface.

The AMF 121 can be responsible for registration management (e.g., for registering UE 101, etc.), connection management, reachability management, mobility management, and lawful interception of AMF-related events, and access authentication and authorization. The AMF 121 can be a termination point for the an N11 reference point between the AMF 121 and the SMF 124. The AMF 121 can provide transport for SM messages between the UE 101 and the SMF 124, and act as a transparent proxy for routing SM messages. AMF 121 can also provide transport for SMS messages between UE 101 and a Short Message Service (SMS) Function (SMSF) (not shown in FIG. 1). AMF 121 can act as SEcurity Anchor Function (SEAF), which can include interaction with the AUSF 122 and the UE 101 and/or receipt of an intermediate key that was established as a result of the UE 101 authentication process. Where Universal Subscriber Identity Module (USIM) based authentication is used, the AMF 121 can retrieve the security material from the AUSF 122. AMF 121 can also include a Single-Connection Mode (SCM) function, which receives a key from the SEA that it uses to derive access-network specific keys. Furthermore, AMF 121 can be a termination point of a RAN Control Plane (CP) interface, which can include or be an N2 reference point between the (R)AN 110 and the AMF 121; and the AMF 121 can be a termination point of Non Access Stratum (NAS) (N1) signaling, and perform NAS ciphering and integrity protection.

AMF 121 can also support NAS signaling with a UE 101 over an Non-3GPP (N3) Inter Working Function (IWF) interface. The N3IWF can be used to provide access to untrusted entities. N3IWF can be a termination point for the N2 interface between the (R)AN 110 and the AMF 121 for the control plane, and can be a termination point for the N3 reference point between the (R)AN 110 and the UPF 102 for the user plane. As such, the AMF 121 can handle N2 signaling from the SMF 124 and the AMF 121 for PDU sessions and QoS, encapsulate/de-encapsulate packets for Internet Protocol (IP) Security (IPSec) and N3 tunneling, mark N3 user-plane packets in the uplink, and enforce QoS corresponding to N3 packet marking taking into account QoS requirements associated with such marking received over N2. N3IWF can also relay uplink and downlink control-plane NAS signaling between the UE 101 and AMF 121 via an N1 reference point between the UE 101 and the AMF 121, and relay uplink and downlink user-plane packets between the UE 101 and UPF 102. The N3IWF also provides mechanisms for IPsec tunnel establishment with the UE 101. The AMF 121 can exhibit an Namf service-based interface, and can be a termination point for an N14 reference point between two AMFs 121 and an N17 reference point between the AMF 121 and a 5G Equipment Identity Register (5G-EIR) (not shown in FIG. 1).

The UE 101 can be registered with the AMF 121 in order to receive network services. Registration Management (RM) is used to register or deregister the UE 101 with the network (e.g., AMF 121), and establish a UE context in the network (e.g., AMF 121). The UE 101 can operate in an RM-REGISTERED state or an RM-DEREGISTERED state. In the RM-DEREGISTERED state, the UE 101 is not registered with the network, and the UE context in AMF 121 holds no valid location or routing information for the UE 101 so the UE 101 is not reachable by the AMF 121. In the RM-REGISTERED state, the UE 101 is registered with the network, and the UE context in AMF 121 can hold a valid location or routing information for the UE 101 so the UE 101 is reachable by the AMF 121. In the RM-REGISTERED state, the UE 101 can perform mobility Registration Update procedures, perform periodic Registration Update procedures triggered by expiration of the periodic update timer (e.g., to notify the network that the UE 101 is still active), and perform a Registration Update procedure to update UE capability information or to re-negotiate protocol parameters with the network, among others.

The AMF 121 can store one or more RM contexts for the UE 101, where each RM context is associated with a specific access to the network. The RM context can be a data structure, database object, etc. that indicates or stores, inter alia, a registration state per access type and the periodic update timer. The AMF 121 can also store a 5GC Mobility Management (MM) context that can be the same or similar to an (Enhanced Packet System (EPS))MM ((E)MM) context. In various embodiments, the AMF 121 can store a Coverage Enhancement (CE) mode B Restriction parameter of the UE 101 in an associated MM context or RM context. The AMF 121 can also derive the value, when needed, from the UE's usage setting parameter already stored in the UE context (and/or MM/RM context).

Connection Management (CM) can be used to establish and release a signaling connection between the UE 101 and the AMF 121 over the N1 interface. The signaling connection is used to enable NAS signaling exchange between the UE 101 and the CN 120, and comprises both the signaling connection between the UE and the AN (e.g., RRC connection or UE-N3IWF connection for non-3GPP access) and the N2 connection for the UE 101 between the AN (e.g., RAN 110) and the AMF 121. The UE 101 can operate in one of two CM states, CM-IDLE mode or CM-CONNECTED mode. When the UE 101 is operating in the CM-IDLE state/mode, the UE 101 may have no NAS signaling connection established with the AMF 121 over the N1 interface, and there can be (R)AN 110 signaling connection (e.g., N2 and/or N3 connections) for the UE 101. When the UE 101 is operating in the CM-CONNECTED state/mode, the UE 101 can have an established NAS signaling connection with the AMF 121 over the N1 interface, and there can be a (R)AN 110 signaling connection (e.g., N2 and/or N3 connections) for the UE 101. Establishment of an N2 connection between the (R)AN 110 and the AMF 121 can cause the UE 101 to transition from CM-IDLE mode to CM-CONNECTED mode, and the UE 101 can transition from the CM-CONNECTED mode to the CM-IDLE mode when N2 signaling between the (R)AN 110 and the AMF 121 is released.

The SMF 124 can be responsible for Session Management (SM) (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to Lawful Interception (LI) system); termination of SM parts of NAS messages; downlink data notification; initiating AN specific SM information, sent via AMF over N2 to AN; and determining Session and Service Continuity (SSC) mode of a session. SM can refer to management of a PDU session, and a PDU session or "session" can refer to a PDU connectivity service that provides or enables the exchange of PDUs between a UE 101 and a data network (DN) 103 identified by a Data Network Name (DNN). PDU sessions can be established upon UE 101 request, modified upon UE 101 and 5GC 120 request, and released upon UE 101 and 5GC 120 request using NAS SM signaling exchanged over the N1 reference point between the UE 101 and the SMF 124. Upon request from an application server, the 5GC 120 can trigger a specific application in the UE 101. In response to receipt of the trigger message, the UE 101 can pass the trigger message (or relevant parts/information of the trigger message) to one or more identified applications in the UE 101. The identified application(s) in the UE 101 can establish a PDU session to a specific DNN. The SMF 124 can check whether the UE 101 requests are compliant with user subscription information associated with the UE 101. In this regard, the SMF 124 can retrieve and/or request to receive update notifications on SMF 124 level subscription data from the UDM 127.

The SMF 124 can include the following roaming functionality: handling local enforcement to apply QoS Service Level Agreements (SLAs) (Visited Public Land Mobile Network (VPLMN)); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 124 can be included in the system 100, which can be between another SMF 124 in a visited network and the SMF 124 in the home network in roaming scenarios. Additionally, the SMF 124 can exhibit the Nsmf service-based interface.

The NEF 123 can provide means for securely exposing the services and capabilities provided by 3GPP network functions for third party, internal exposure/re-exposure, Application Functions (e.g., AF 128), edge computing or fog computing systems, etc. In such embodiments, the NEF 123 can authenticate, authorize, and/or throttle the AFs. NEF 123 can also translate information exchanged with the AF 128 and information exchanged with internal network functions. For example, the NEF 123 can translate between an AF-Service-Identifier and an internal 5GC information. NEF 123 can also receive information from other network functions (NFs) based on exposed capabilities of other network functions. This information can be stored at the NEF 123 as structured data, or at a data storage NF using standardized interfaces. The stored information can then be re-exposed by the NEF 123 to other NFs and AFs, and/or used for other purposes such as analytics. Additionally, the NEF 123 can exhibit an Nnef service-based interface.

The NRF 125 can support service discovery functions, receive NF discovery requests from NF instances, and provide the information of the discovered NF instances to the NF instances. NRF 125 also maintains information of available NF instances and their supported services. As used herein, the terms "instantiate," "instantiation," and the like can refer to the creation of an instance, and an "instance" can refer to a concrete occurrence of an object, which can occur, for example, during execution of program code. Additionally, the NRF 125 can exhibit the Nnrf service-based interface.

The PCF 126 can provide policy rules to control plane function(s) to enforce them, and can also support unified policy framework to govern network behavior. The PCF 126 can also implement an FE to access subscription information relevant for policy decisions in a UDR of the UDM 127. The PCF 126 can communicate with the AMF 121 via an N15 reference point between the PCF 126 and the AMF 121, which can include a PCF 126 in a visited network and the AMF 121 in case of roaming scenarios. The PCF 126 can communicate with the AF 128 via an N5 reference point between the PCF 126 and the AF 128; and with the SMF 124 via an N7 reference point between the PCF 126 and the SMF 124. The system 100 and/or CN 120 can also include an N24 reference point between the PCF 126 (in the home network) and a PCF 126 in a visited network. Additionally, the PCF 126 can exhibit an Npcf service-based interface.

The UDM 127 can handle subscription-related information to support the network entities' handling of communication sessions, and can store subscription data of UE 101. For example, subscription data can be communicated between the UDM 127 and the AMF 121 via an N8 reference point between the UDM 127 and the AMF. The UDM 127 can include two parts, an application Functional Entity (FE) and a Unified Data Repository (UDR) (the FE and UDR are not shown in FIG. 1). The UDR can store subscription data and policy data for the UDM 127 and the PCF 126, and/or structured data for exposure and application data (including Packet Flow Descriptions (PFDs) for application detection, application request information for multiple UEs 101) for the NEF 123. The Nudr service-based interface can be exhibited by the UDR 221 to allow the UDM 127, PCF 126, and NEF 123 to access a particular set of the stored data, as well as to read, update (e.g., add, modify), delete, and subscribe to notification of relevant data changes in the UDR. The UDM can include a UDM-FE, which is in charge of processing credentials, location management, subscription management and so on. Several different FEs can serve the same user in different transactions. The UDM-FE accesses subscription information stored in the UDR and performs authentication credential processing, user identification handling, access authorization, registration/mobility management, and subscription management. The UDR can interact with the SMF 124 via an N10 reference point between the UDM 127 and the SMF 124. UDM 127 can also support SMS management, wherein an SMS-FE implements similar application logic as discussed elsewhere herein. Additionally, the UDM 127 can exhibit the Nudm service-based interface.

The AF 128 can provide application influence on traffic routing, provide access to NEF 123, and interact with the policy framework for policy control. 5GC 120 and AF 128 can provide information to each other via NEF 123, which can be used for edge computing implementations. In such implementations, the network operator and third party services can be hosted close to the UE 101 access point of attachment to achieve an efficient service delivery through the reduced end-to-end latency and load on the transport network. For edge computing implementations, the 5GC can select a UPF 102 close to the UE 101 and execute traffic steering from the UPF 102 to DN 103 via the N6 interface. This can be based on the UE subscription data, UE location, and information provided by the AF 128. In this way, the AF 128 can influence UPF (re)selection and traffic routing. Based on operator deployment, when AF 128 is considered to be a trusted entity, the network operator can permit AF 128 to interact directly with relevant NFs. Additionally, the AF 128 can exhibit an Naf service-based interface.

The NSSF 129 can select a set of network slice instances serving the UE 101. The NSSF 129 can also determine allowed Network Slice Selection Assistance Information (NSSAI) and the mapping to the subscribed Single NSSAIs (S-NSSAIs), as appropriate. The NSSF 129 can also determine the AMF set to be used to serve the UE 101, or a list of candidate AMF(s) 121 based on a suitable configuration and possibly by querying the NRF 125. The selection of a set of network slice instances for the UE 101 can be triggered by the AMF 121 with which the UE 101 is registered by interacting with the NSSF 129, which can lead to a change of AMF 121. The NSSF 129 can interact with the AMF 121 via an N22 reference point between AMF 121 and NSSF 129; and can communicate with another NSSF 129 in a visited network via an N31 reference point (not shown in FIG. 1). Additionally, the NSSF 129 can exhibit an Nnssf service-based interface.

As discussed previously, the CN 120 can include an SMSF, which can be responsible for SMS subscription checking and verification, and relaying SM messages to/from the UE 101 to/from other entities, such as an SMS-Gateway Mobile services Switching Center (GMSC)/Inter-Working MSC (IWMSC)/SMS-router. The SMSF can also interact with AMF 121 and UDM 127 for a notification procedure that the UE 101 is available for SMS transfer (e.g., set a UE not reachable flag, and notifying UDM 127 when UE 101 is available for SMS).

The CN 120 can also include other elements that are not shown in FIG. 1, such as a Data Storage system/architecture, a 5G-EIR, a Security Edge Protection Proxy (SEPP), and the like. The Data Storage system can include a Structured Data Storage Function (SDSF), an Unstructured Data Storage Function (UDSF), and/or the like. Any NF can store and retrieve unstructured data into/from the UDSF (e.g., UE contexts), via N18 reference point between any NF and the UDSF (not shown in FIG. 1). Individual NFs can share a UDSF for storing their respective unstructured data or individual NFs can each have their own UDSF located at or near the individual NFs. Additionally, the UDSF can exhibit an Nudsf service-based interface (not shown in FIG. 1). The 5G-EIR can be an NF that checks the status of Permanent Equipment Identifier (PEI) for determining whether particular equipment/entities are blacklisted from the network; and the SEPP can be a non-transparent proxy that performs topology hiding, message filtering, and policing on inter-PLMN control plane interfaces.

Additionally, there can be many more reference points and/or service-based interfaces between the NF services in the NFs; however, these interfaces and reference points have been omitted from FIG. 1 for clarity. In one example, the CN 120 can include an Nx interface, which is an inter-CN interface between the MME (e.g., a non-5G MME) and the AMF 121 in order to enable interworking between CN 120 and a non-5G CN. Other example interfaces/reference points can include an N5g-EIR service-based interface exhibited by a 5G-EIR, an N27 reference point between the Network Repository Function (NRF) in the visited network and the NRF in the home network; and an N31 reference point between the NSSF in the visited network and the NSSF in the home network.

Figure 2:
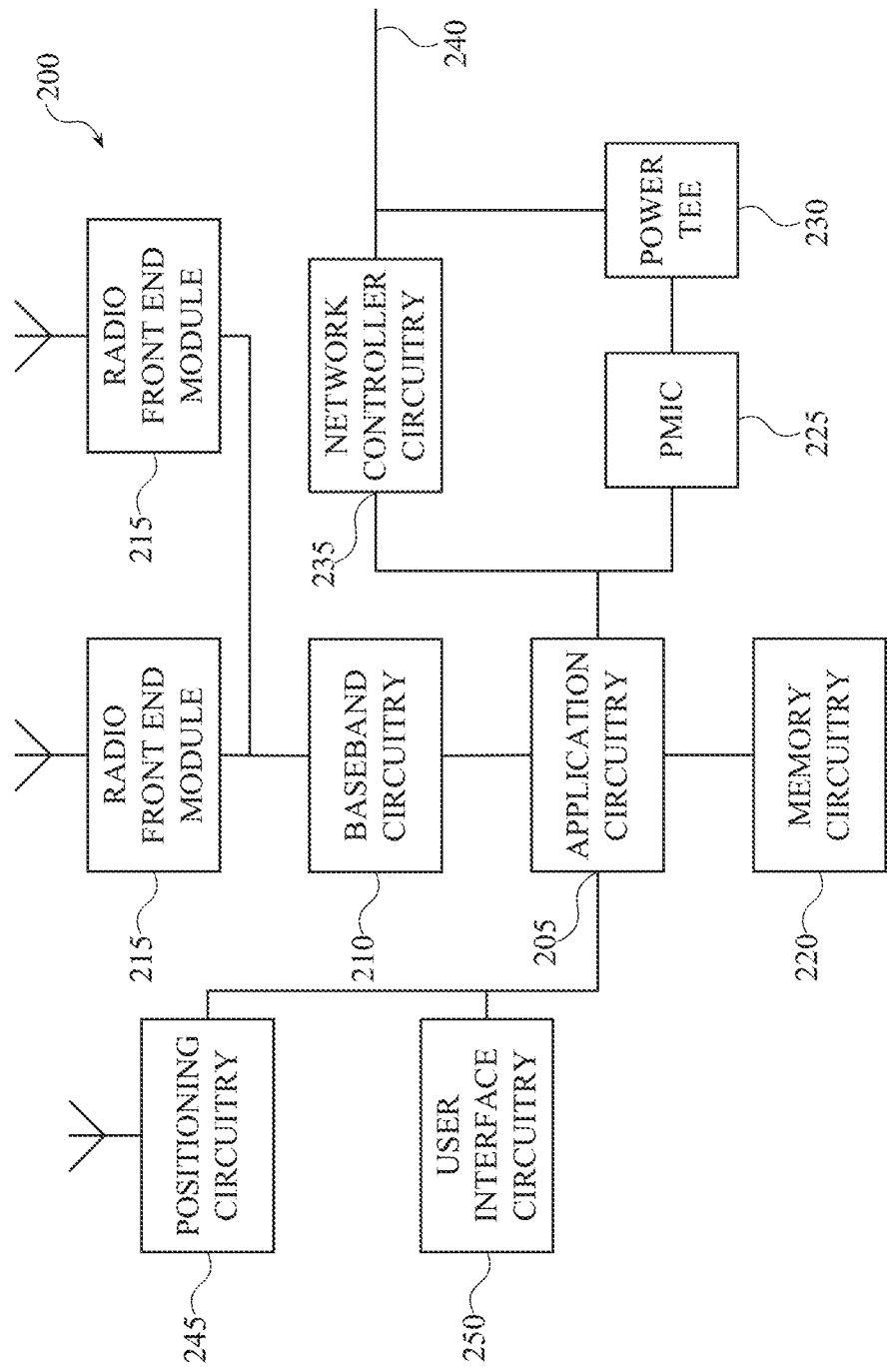
FIG. 2 is a diagram illustrating example components of an infrastructure equipment device such as a base station (BS) that can be employed in accordance with various aspects discussed herein.

Referring to FIG. 2, illustrated are example components of an infrastructure equipment device 200 in accordance with some embodiments. The infrastructure equipment 200 (or "system 200") can be implemented as a base station (e.g., eNB, gNB, etc.), radio head, RAN node such as a node of RAN 110 shown and described previously, another access point (AP) or base station (BS), application server(s), and/or any other element/device discussed herein. In other examples, the system 200 could be implemented in or by a UE.

The system 200 includes application circuitry 205, baseband circuitry 210, one or more radio front end modules (RFEMs) 215, memory circuitry 220, power management integrated circuitry (PMIC) 225, power tee circuitry 230, network controller circuitry 235, network interface connector 240, satellite positioning circuitry 245, and user interface 250. In some embodiments, the device 200 can include additional elements such as, for example, memory/storage, display, camera, sensor, or input/output (I/O) interface. In other embodiments, the components described below can be included in more than one device. For example, said circuitries can be separately included in more than one device for CRAN, vBBU, or other like implementations.

Application circuitry 205 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 205 can be coupled with or can include memory/storage elements and can be configured to execute instructions stored in the memory/storage to enable various applications or operating systems to run on the system 200. In some implementations, the memory/storage elements can be on-chip memory circuitry, which can include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 205 can include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 205 can comprise, or can be, a special-purpose processor/controller to operate according to the various embodiments herein. As examples, the processor(s) of application circuitry 205 can include one or more Apple® processors, Intel® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 200 may not utilize application circuitry 205, and instead can include a special-purpose processor/controller to process IP data received from an EPC or 5GC, for example.

User interface circuitry 250 can include one or more user interfaces designed to enable user interaction with the system 200 or peripheral component interfaces designed to enable peripheral component interaction with the system 200. User interfaces can include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces can include, but are not limited to, a nonvolatile memory port, a universal serial bus (USB) port, an audio jack, a power supply interface, etc.

The components shown by FIG. 2 can communicate with one another using interface circuitry, which can include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX can be a proprietary bus, for example, used in a SoC based system. Other bus/IX systems can be included, such as an I2C interface, an SPI interface, point to point interfaces, and a power bus, among others.

Figure 3:
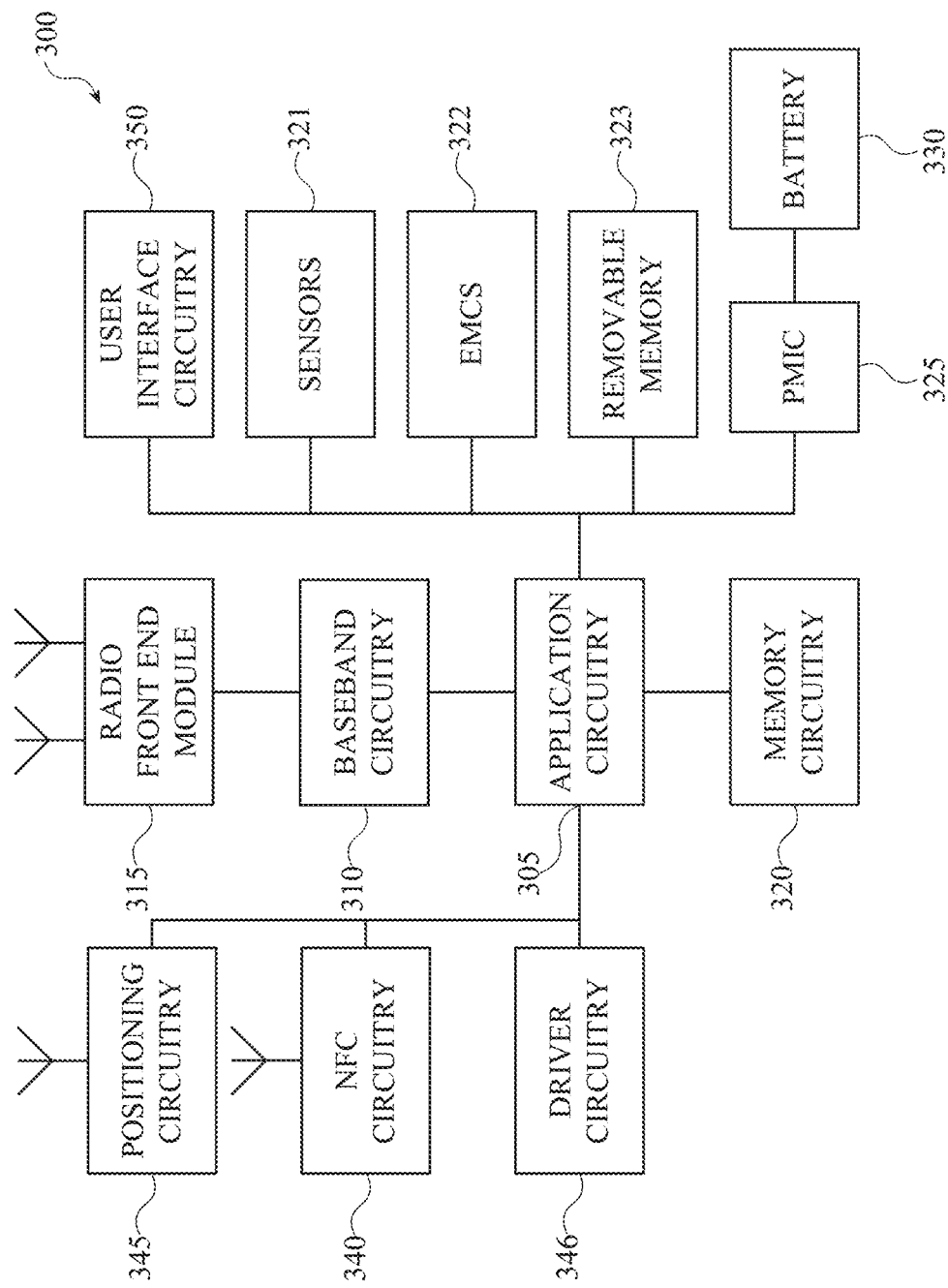
FIG. 3 is a diagram illustrating example components of a user equipment (UE) device that can be employed in accordance with various aspects discussed herein.

Referring to FIG. 3, illustrated is an example of a platform 300 (or "device 300") in accordance with various embodiments. In embodiments, the computer platform 1400 can be suitable for use as UEs 101 and/or any other element/device discussed herein. The platform 300 can include any combinations of the components shown in the example. The components of platform 300 can be implemented as integrated circuits (ICs), portions thereof, discrete electronic devices, or other modules, logic, hardware, software, firmware, or a combination thereof adapted in the computer platform 300, or as components otherwise incorporated within a chassis of a larger system. The block diagram of FIG. 3 is intended to show a high-level view of components of the computer platform 300. However, some of the components shown can be omitted, additional components can be present, and different arrangement of the components shown can occur in other implementations.

Application circuitry 305 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 305 can be coupled with or can include memory/storage elements and can be configured to execute instructions stored in the memory/storage to enable various applications or operating systems to run on the system 300. In some implementations, the memory/storage elements can be on-chip memory circuitry, which can include any suitable volatile and/or non-volatile memory, such as DRAM, SRAM, EPROM, EEPROM, Flash memory, solid-state memory, and/or any other type of memory device technology, such as those discussed herein.

As examples, the processor(s) of application circuitry 305 can include a general or special purpose processor, such as an A-series processor (e.g., the A13 Bionic), available from Apple® Inc., Cupertino, Calif. or any other such processor. The processors of the application circuitry 305 can also be one or more of Advanced Micro Devices (AMD) Ryzen® processor(s) or Accelerated Processing Units (APUs); Core processor(s) from Intel® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 305 can be a part of a system on a chip (SoC) in which the application circuitry 305 and other components are formed into a single integrated circuit, or a single package.

The baseband circuitry 310 can be implemented, for example, as a solder-down substrate including one or more integrated circuits, a single packaged integrated circuit soldered to a main circuit board or a multi-chip module containing two or more integrated circuits.

The platform 300 can also include interface circuitry (not shown) that is used to connect external devices with the platform 300. The external devices connected to the platform 300 via the interface circuitry include sensor circuitry 321 and electro-mechanical components (EMCs) 322, as well as removable memory devices coupled to removable memory circuitry 323.

A battery 330 can power the platform 300, although in some examples the platform 300 can be mounted deployed in a fixed location, and can have a power supply coupled to an electrical grid. The battery 330 can be a lithium ion battery, a metal-air battery, such as a zinc-air battery, an aluminum-air battery, a lithium-air battery, and the like. In some implementations, such as in V2X applications, the battery 330 can be a typical lead-acid automotive battery.

Figure 4:
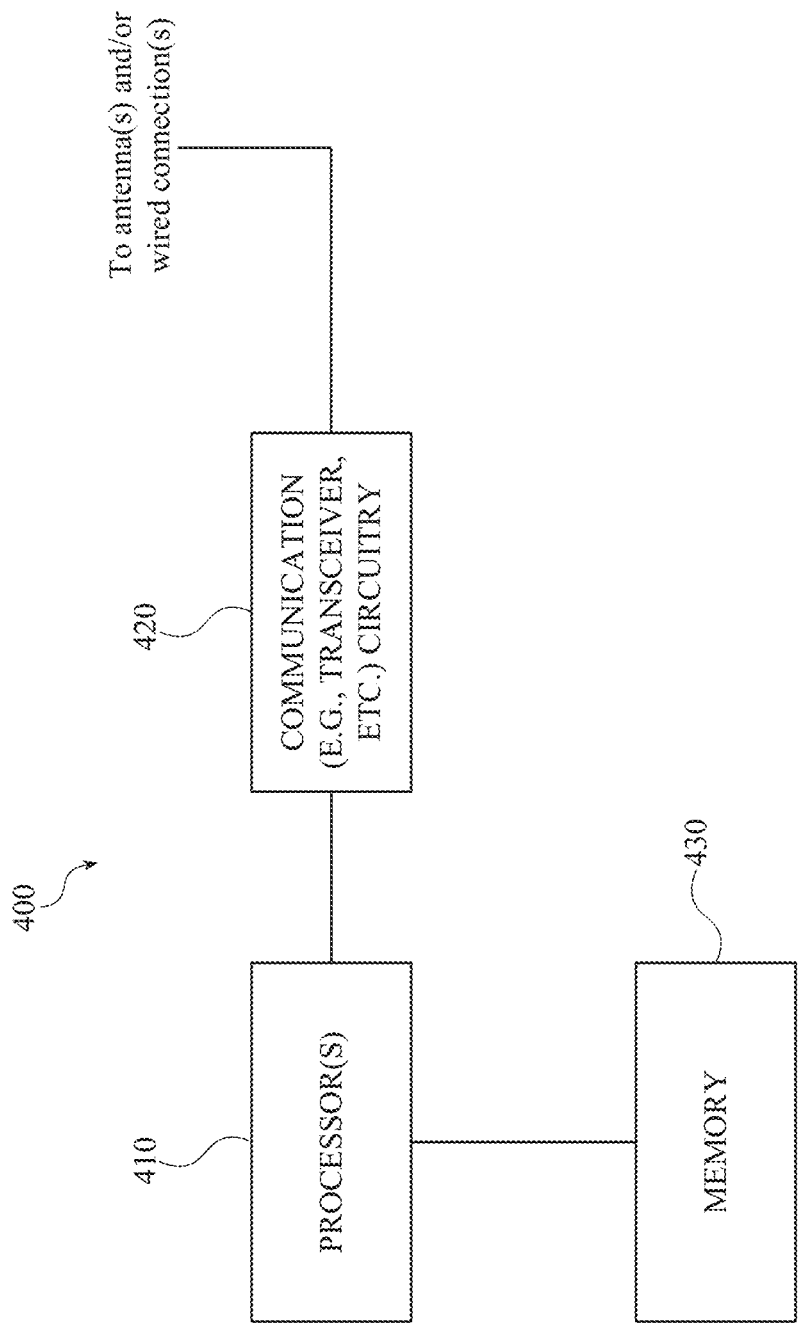
FIG. 4 is a block diagram illustrating a system that facilitates NR-U operation based on one or more configured time resources for UL transmission, according to various techniques discussed herein.

Referring to FIG. 4, illustrated is a block diagram of a system 400 employable at a UE (User Equipment), a next generation Node B (gNodeB or gNB) or other BS (base station)/TRP (Transmit/Receive Point), or another component of a 3GPP (Third Generation Partnership Project) network (e.g., a 5GC (Fifth Generation Core Network)) component or function such as a UPF (User Plane Function)) that facilitates NR-U operation based on one or more configured time resources for UL transmission, according to various techniques discussed herein, in various embodiments. System 400 can include processor(s) 410, communication circuitry 420, and memory 430. Processor(s) 410 (e.g., which can comprise one or more processors of FIG. 2 or FIG. 3, etc.) can comprise processing circuitry and associated interface(s). Communication circuitry 420 can comprise, for example circuitry for wired and/or wireless connection(s) (e.g., Radio Front End Module(s) 215 or 315, etc.), which can include transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof). Memory 430 can comprise one or more memory devices (e.g., memory circuitry 220 or 320, removable memory 323, local memory (e.g., including CPU register(s)) of processor(s) discussed herein, etc.) which can be of any of a variety of storage mediums (e.g., volatile and/or non-volatile according to any of a variety of technologies/constructions, etc.), and can store instructions and/or data associated with one or more of processor(s) 410 or transceiver circuitry 420).

Specific types of embodiments of system 400 (e.g., UE embodiments) can be indicated via subscripts (e.g., system $400_{UE}$ comprising processor(s) $410_{UE}$, communication circuitry $420_{UE}$, and memory $430_{UE}$). In some embodiments, such as BS embodiments (e.g., system $400_{gNB}$) and network component (e.g., UPF (User Plane Function), etc.) embodiments (e.g., system $400_{UPF}$) processor(s) $410_{gNB}$ (etc.), communication circuitry (e.g., $420_{gNB}$, etc.), and memory (e.g., $430_{gNB}$, etc.) can be in a single device or can be included in different devices, such as part of a distributed architecture. In embodiments, signaling or messaging between different embodiments of system 400 (e.g., $400_1$ and $400_2$) can be generated by processor(s) $410_1$, transmitted by communication circuitry $420_1$ over a suitable interface or reference point (e.g., a 3GPP air interface, N3, N4, etc.), received by communication circuitry $420_2$, and processed by processor(s) $410_2$. Depending on the type of interface, additional components (e.g., antenna(s), network port(s), etc. associated with system(s) $400_1$ and $400_2$) can be involved in this communication.

In various aspects discussed herein, signals and/or messages can be generated and output for transmission, and/or transmitted messages can be received and processed. Depending on the type of signal or message generated, outputting for transmission (e.g., by processor(s) 410, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping to one or more Resource Elements (REs) (e.g., a scheduled set of resources, a set of time and frequency resources granted for uplink transmission, etc.), wherein each RE can span one subcarrier in a frequency domain and one symbol in a time domain (e.g., wherein the symbol can be according to any of a variety of access schemes, e.g., Orthogonal Frequency Division Multiplexing (OFDM), Single Carrier Frequency Division Multiple Access (SC-FDMA), etc.). Depending on the type of received signal or message, processing (e.g., by processor(s) 410, etc.) can comprise one or more of: identifying physical resources associated with the signal/message, detecting the signal/message, resource element group deinterleaving, demodulation, descrambling, and/or decoding.

In various aspects, one or more of information (e.g., system information, resources associated with signaling, etc.), features, parameters, etc. can be configured to a UE via signaling (e.g., associated with one or more layers, such as L1 signaling or higher layer signaling (e.g., MAC, RRC, etc.)) from a gNB or other access point (e.g., via signaling generated by processor(s) $410_{gNB}$, transmitted by communication circuitry $420_{gNB}$, received by communication circuitry $420_{UE}$, and processed by processor(s) $410_{UE}$). Depending on the type of information, features, parameters, etc., the type of signaling employed and/or the exact details of the operations performed at the UE and/or gNB in processing (e.g., signaling structure, handling of PDU(s)/SDU(s), etc.) can vary. However, for convenience, such operations can be referred to herein as configuring information/feature(s)/parameter(s)/etc. to a UE, generating or processing configuration signaling, or via similar terminology.

Now that the main building blocks for the framework of NR have been established, one potential enhancement is to allow NR to also operate on unlicensed spectrum. Investigation into expanding 5G NR to shared/unlicensed spectrum has already begun, and a new work item (WI) on "NR-Based Access to Unlicensed Spectrum" was approved in Technical Specification Group (TSG) Radio Access Network (RAN) Meeting #82.

Objectives of this new WI comprise physical layer aspects including [related to RAN1 (RAN WG1 (Working Group 1))]: (a) Frame structure, including single and multiple DL (Downlink) to UL (Uplink) and UL to DL switching points within a shared Continuity (COT) with associated identified LBT (Listen Before Talk) behavior and/or requirements (3GPP Technical Report (TR) 38.889 Section 7.2.1.3.1) and (b) UL data channel, including extension of PUSCH (Physical Uplink Shared Channel) to support PRB (Physical Resource Block)-based frequency block-interlaced transmission, support of multiple PUSCH(s) starting positions in one or multiple slot(s) depending on the LBT outcome (e.g., whether or not the spectrum associated with the unlicensed carrier(s) is/are clear) with the understanding that the ending position is indicated by the UL grant, with the design not requiring the UE to change a granted TBS (Transport Block Size) for a PUSCH transmission depending on the LBT outcome, wherein the PUSCH enhancements are based on CP (Cyclic Prefix)-OFDM (Orthogonal Frequency Division Multiplexing), and wherein applicability of sub-PRB frequency block-interlaced transmission for 60 kHz is left to be decided by RAN1.

Additional objectives of this WI comprise physical layer procedure(s) including [RAN1, RAN2]: (a) For LBT, a channel access mechanism in line with agreements from the NR-U (NR Unlicensed Spectrum) study item (TR 38.889, Section 7.2.1.3.1), with specification work to be performed by RAN1; (b) HARQ (Hybrid Automatic Repeat reQuest) operation, wherein the NR HARQ feedback mechanisms are the baseline for NR-U operation with extensions in line with agreements during the study phase (NR-U TR section 7.2.1.3.3), including immediate transmission of HARQ A/N (ACK (ACKnowledgment)/NACK (Negative ACKnowledgment)) for the corresponding data in the same shared COT as well as transmission of HARQ A/N in a subsequent COT, and potentially support mechanisms to provide multiple and/or supplemental time and/or frequency domain transmission opportunities (RAN1); (c) Scheduling multiple TTIs (Transmission Time Intervals) for PUSCH in-line with agreements from the study phase (TR 38.889, Section 7.2.1.3.3) (RAN1); (d) Configured Grant operation, wherein NR Type-1 and Type-2 configured grant mechanisms are the baseline for NR-U operation with modifications in line with agreements during the study phase (NR-U TR section 7.2.1.3.4) (RAN1); and (e) Data multiplexing aspects (for both UL and DL) considering LBT and channel access priorities (RAN1/ RAN2).

While the aforementioned WI is at its initial stage, aspects of the design can be identified that can be enhanced for NR when operating in unlicensed spectrum. One consideration in this case is that an NR system operating in unlicensed spectrum should maintain fair coexistence with other incumbent technologies, and in order to do so (depending on the particular band in which it might operate), some restrictions might be taken into account when designing this system. For instance, if operating in the 5 GHz band, a listen before talk (LBT) procedure is to be performed in some parts of the world to acquire the medium before a transmission can occur.

One of the configurations for configured grants in NR-U is the configuration of the time-domain resources allowed for this feature. If this type of configuration is performed through RRC signaling, due to the periodic values that the configured grant can assume, the RRC can have a variable length which depends on the value of the periodicity or can be a multiple integer of the periodicity itself. Furthermore, the Rel-15 (3GPP Release 15) time-domain allocation, which is the baseline for time-domain allocation for CG (Configured Grant) operation in NR-U, only provides one uplink PUSCH transmission during each periodicity. In consideration of the LBT procedure in NR-U, the Rel-15 allocation approach will not allow the UE to access the channel very efficiently, since it may fail to access the channel in its single slot opportunity during the periodicity. Therefore, an approach that allows multiple channel access opportunities within a periodicity can be advantageous for efficient usage of the channel. Various embodiments can employ one or more of the multiple techniques discussed herein that provide multiple channel access opportunities within a periodicity.

To enable configured grant transmissions in NR operating on unlicensed spectrum, the time-domain resources allowed for this configuration should be appropriately configured. If this configuration is performed through RRC signaling, due to the periodic values that the configured grant can assume, the RRC can have a variable length which can depend on the value of the periodicity or can be a multiple integer of the periodicity itself. Various embodiments can employ one or more of the multiple techniques discussed herein to address this issue.

In Rel. 15 FeLAA (Further Enhanced Licensed Assisted Access) AUL (Autonomous Uplink), an RRC (Radio Resource Control) configured bitmap of X=40 bits is used to indicate the allowed time-domain resources for AUL transmission at the subframe level. In various embodiments, a similar approach can be used for NR-U to configure the time-domain resources for the configured grant (CG) operation. However, the baseline design for CG in NR-U is the NR Rel-15 configured grant design, which for time-domain allocation comprises the following parameters: {periodicity, slot offset, starting symbol and length indicator value (SLIV), and repK [the number of transmissions (K) of a TB within a bundle of the configured uplink grant]}. Therefore, the time-domain allocation for CG in NR-U can either enhance or replace the Rel-15 time-domain allocation.

Enhancements to the Rel-15 CG design can comprise techniques such as reinterpreting the Rel-15 parameters so that they are more useful for the unlicensed operation, adding new parameters on top of the Rel-15 parameters, and/or replacing/disabling some of the current parameters. One option for enhancing or replacing the Rel-15 time-domain allocation is the use of a bitmap. In embodiments employing a bitmap, various techniques discussed herein can clarify how this bitmap will preserve the functions of the Rel-15 time-domain allocation, while improving the efficiency of the UE's ability to use the time resources. Thus, techniques discussed herein can define how this bitmap is interpreted when the PUSCH repetition is larger or equal to the length of this bitmap. Another issue is that if a bitmap of fixed length is defined for any desired CG periodicity of P units, the bitmap length of X units should be an integer multiple of P (or vice versa), for example, wherein X satisfies the formula X mod P=0 when X>P (or vice-versa when X<P). This can imply that the choice of the fixed length bitmap of length X can be further enhanced in order to support the allocation of periodic time-domain resources of the supported Rel-15 values of P.

Based on Rel. 15 NR, the configured grant periodicities allowed are: (a) for 15 kHz, P can be 2, 7, or n*14 symbols, where n∈{1, 2, 4, 5, 8, 10, 16, 20, 32, 40, 64, 80, 128, 160, 320, 640}; (b) for 30 kHz, P can be 2, 7, or n*14 symbols, where n∈{1, 2, 4, 5, 8, 10, 16, 20, 32, 40, 64, 80, 128, 160, 256, 320, 640, 1280}; and (c) for 60 kHz with normal CP: P can be 2, 7, or n*14 symbols, where n∈{1, 2, 4, 5, 8, 10, 16, 20, 32, 40, 64, 80, 128, 160, 256, 320, 512, 640, 1280, 2560}.

Bitmap for Replacement of Rel-15 Allocation

Various embodiments can employ techniques discussed herein related to the design of a bitmap approach to replace the Rel-15 time-domain allocation for CG in NR-U.

In various embodiments, the time-domain resources can be configured through RRC signaling via a bitmap. The bitmap can comprise X bits, wherein each bit corresponds to a time resource (e.g., symbol, slot, subframe, radio frame, etc.), and can indicate whether that time resource is associated with a Configured Grant for UL transmission (e.g., in an unlicensed band or otherwise). As one illustrative example, X can be 40, and each bit can correspond to a slot. In some embodiments, the value of X can be the same regardless of the subcarrier spacing (SCS) used, while in other embodiments, the value of X can be scaled based on the subcarrier spacing (for example, X=40 bits for 15 KHz SCS, X=80 bits for 30 KHz SCS, X=160 bits for 60 KHz SCS, etc.).

In other embodiments, X can be constant and independent of SCS, and the granularity of signaled time resources can be indicated by a parameter G, where G can take on several granularities to accommodate different service/traffic types. For example, G∈{2 OFDM symbols (OS), 7 OS, 1 slot, 2 slots, 4 slots}. In still other embodiments, X can be variable, X and G can be independent of each other and of SCS, and configurable in the CG activation.

In various embodiments, one or more of the following options can be employed for mapping the bitmap to CG period(s).

In a first option, in some embodiments, regardless of the CG periodicity (P) used, the bitmap (of length X) can be repeated, and its value can be interpreted accordingly. Referring to FIG. 5A, illustrated is a pair of diagrams showing examples of a bitmap (of example length X=40) that can be repeated over time independently of a Configured Grant (CG) periodicity (e.g., of 16 (top diagram) or 64 (bottom diagram)), according to various embodiments discussed herein.

In a second option, in some embodiments, if the length in time resource units of each periodicity value (P) is smaller than the corresponding length of the bitmap X using the same time resource units, then for each period, the first P time unit resources of the bitmap can be used. Referring to FIG. 5B, illustrated is a diagram showing an example of a bitmap (of example length X=40) wherein for a CG periodicity P<X, the P time-domain resource elements of each CG period can be configured based on the first P elements of the bitmap of length X, according to various embodiments discussed herein.

Figure 6A:
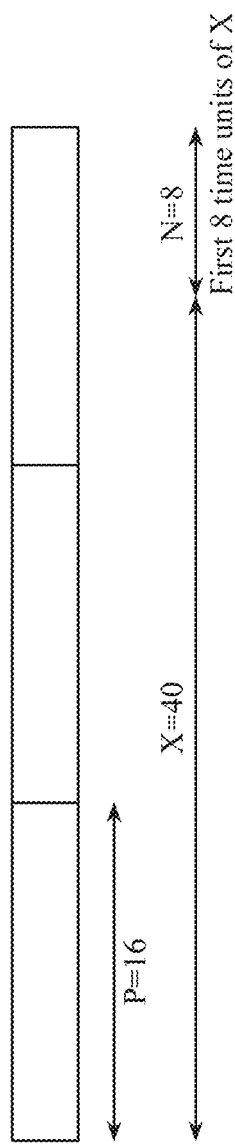
FIG. 6A is a diagram illustrating an example of a bitmap (of example length X=40) wherein for each group of n CG periods of length P, the resource allocation follows the bitmap, and if resource units of the last period of each group are not covered by the bitmap, then the first nP-X time resource units of the bitmap are used, according to various embodiments discussed herein.

In a third option, in some embodiments, if the length in time resource units of each periodicity value (P) is smaller than the corresponding length of the bitmap X using the same time resource units, for each group of time-domain resources which are covered by n periods (each group of n×P time domain resources), where n is such that n×P=X or (n×P>X and (n−1)×P<X) (e.g., n is the smallest integer such that n×P≥X), the bitmap X is used, and the spare resources (if any) that are not covered by the length of the bitmap within the last period are configured using the first (nP−X) time domain configuration of the bitmap. Referring to FIG. 6A, illustrated is a diagram showing an example of a bitmap (of example length X=40) wherein for each group of n CG periods of length P, the resource allocation follows the bitmap, and if resource units of the last period of each group are not covered by the bitmap, then the first nP−X time resource units of the bitmap are used, according to various embodiments discussed herein.

In various embodiments, when P<X and X mod P≠0, in general, the bitmap of length X can be designed with a resource allocation such that the allocation pattern repeats every P time resources, regardless of the bitmap length. However, if the periodic allocation will occur N total times such that NP>X, let n be the maximum integer such that X−nP>0, and M be the minimum integer such that NP<MX (wherein the bitmap is applied M consecutive times). In various embodiments, after the first X bits, the second application of the bitmap can then be applied circularly shifted to the left by L bits (e.g., with the bits representing symbols, slots, subframes, etc.), where L=X−nP. Similarly, the m-th bitmap can be circularly shifted by (m−1)×L mod P bits, for m=1, . . . , M.

In some embodiments employing circular shift, the greatest common factor between P and X can be used to reduce the indication information of the circular shift. Let the greatest common factor between P and X be Q. Then the circular shift can be indicated in multiples of Q time intervals (e.g., symbols, slots, subframes, etc.). The second X bits will have the bitmap applied with a circular shift to the left by L multiples of Q slots, where LQ=X−nP. Then for the m-th bitmap application, the bitmap can be circularly shifted by (m−1)×L mod P/Q bits, for m=1, . . . , M.

Figure 6B:
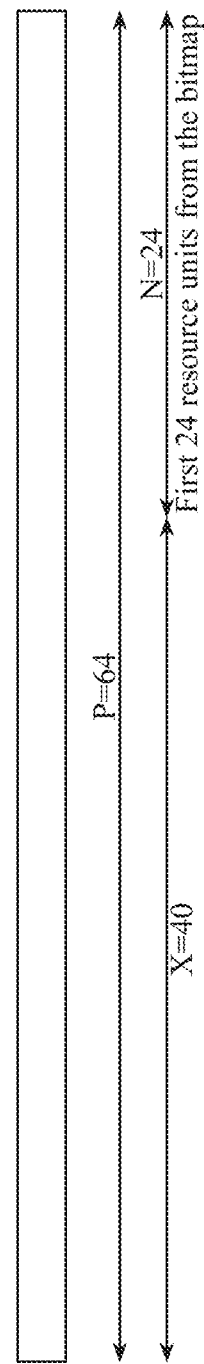
FIG. 6B is a diagram illustrating an example of a bitmap (of example length X=40) wherein the resource allocation is based on the bitmap, with any remaining time domain units configured by repeating in time the bitmap up to the end of the period, according to various aspects discussed herein.

In a fourth option, in some embodiments, if the length in time resource units of each period value (P) is larger than the corresponding length of the bitmap X using the same time resource units, then for each period, the first X time-domain resources can be configured according to the bitmap, while the remaining time resource units can be configured by repeating in time the bitmap (or a portion thereof, if the full bitmap does not fit) until the end of the period. Referring to FIG. 6B, illustrated is a diagram showing an example of a bitmap (of example length X=40) wherein the resource allocation is based on the bitmap, with any remaining time domain units configured by repeating in time the bitmap up to the end of the period, according to various aspects discussed herein.

In a fifth option, in some embodiments, if the length in time resource units of each period value is larger than the corresponding length of the bitmap X using the same time resource units, the first X resource units within a period are configured following the bitmap, while the remaining resources within a period are not used for configured grant transmission. In some such embodiments, bitmap X and a repetition Y can be configured, where X resource units are repeated Y times for allocating configured grant resource in the beginning of a period, while the remaining resources within the period are not used for configured grant transmission.

Figure 7:
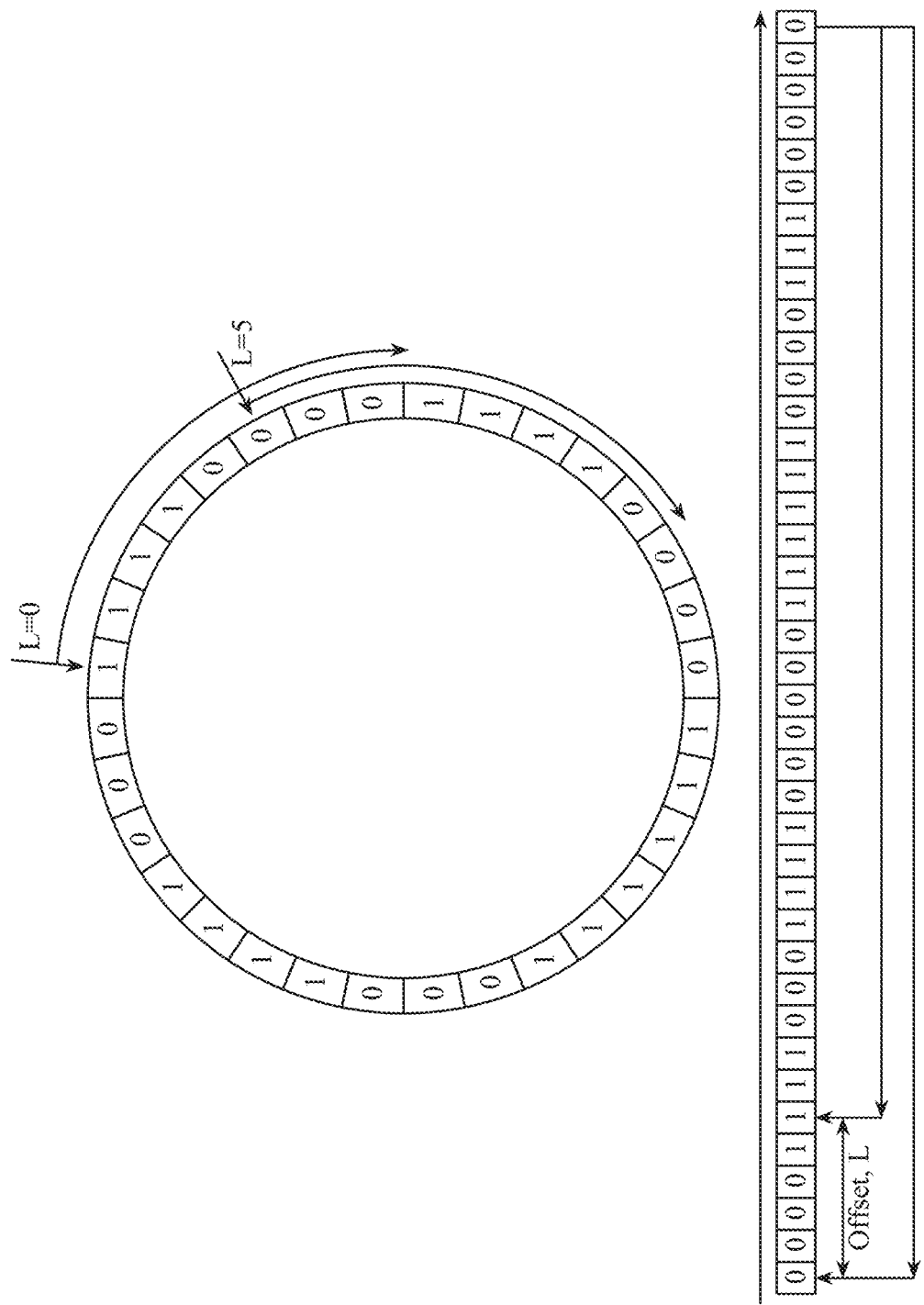
FIG. 7 is a pair of diagrams illustrating example representations of bitmaps that have been cyclically shifted by an offset (L=5 in the example), according to various embodiments discussed herein.

In a sixth option, in some embodiments, in order to increase flexibility in the way time domain resources can be configured when a bitmap is used, when the period is larger than the X, the bitmap can be repeated using a cyclic shift with offset. Referring to FIG. 7, illustrated is a pair of diagrams showing example representations of bitmaps that have been cyclically shifted by an offset (L=5 in the example), according to various embodiments discussed herein. In the top diagram of FIG. 7, a bitmap is represented as a circular array showing offsets of 0 and 5, and in the bottom diagram of FIG. 7, another bitmap is represented as a linear array with offsets of 0 and 5. For each repetition, the new bitmap can be defined as the original X bits cyclically shifted by a value equal to the offset, L. This operation is similar to shifting an array B circularly as Y=circshift (B,L), where B is the original bitmap, L is the offset, and Y is the circularly shifted version of B. In the top diagram of FIG. 7, the cyclically shifted bitmap is a bitmap of the same length as the original, with a starting point L (the offset) bits clockwise from the starting point of the original (unshifted) bitmap. In the bottom diagram, the cyclically shifted bitmap is a bitmap of the same length as the original, with a starting point L (the offset) bits to the right of the starting point of the original (unshifted) bitmap, with the first bit of the original bitmap following the last bit of the original bitmap similarly to the circular representation of the top diagram.

Figure 8A:
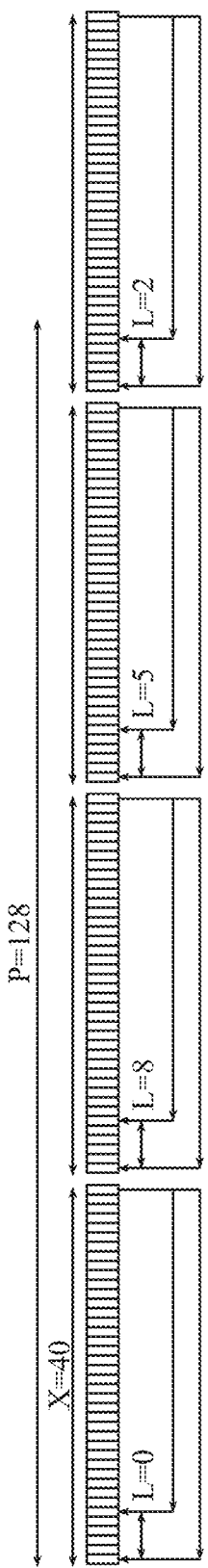
FIG. 8A is a diagram illustrating an example of a bitmap (of example length X=40) wherein the resource allocation is based on the bitmap, with any remaining time domain units configured by repeating in time cyclically shifted versions of the bitmap up to the end of the period, according to various aspects discussed herein.

Referring to FIG. 8A, illustrated is a diagram showing an example of a bitmap (of example length X=40) wherein the resource allocation is based on the bitmap, with any remaining time domain units configured by repeating in time cyclically shifted versions of the bitmap up to the end of the period, according to various aspects discussed herein. In some embodiments employing cyclically shifted bitmap(s), the offset can be the same for all the repetitions, while in other embodiments, the offset can differ between repetitions (although some value(s) can optionally be repeated in such embodiments). In some embodiments, L can be 0 for the first bitmap, and then a common offset or different offset(s) can be used for other bitmaps.

In some embodiments, the offset value(s) can be carried in different RRC parameter(s) from the bitmap, while in other embodiments, the offset value(s) can be carried together with the bitmap. One example manner of indicating the offset value(s) with the bitmap is to expand the bitmap from X to X+M bits, where M are one of the MSB or LSB bits of the bitmap, and wherein the MSB/LSB are used to signal the offset. In some such embodiments, 2 or 3 bits used to signal a common offset or each offset.

In some embodiments, the UE can be configured with a table, such that each entry in the table contains a bitmap allocation configuration, which includes the bitmap, cyclic shifts, granularity, and optionally one or more other parameters associated with the allocation. The UE can be assigned the index of the entry of the allocation, where the index is indicated in the RRC for CG type 1, or activation Downlink Control Information (DCI) in CG type 2. In one embodiment, multiple bitmap are configured per UE based on the traffic/service, and it is up to the UE to select one of them. In one embodiment, once the UE has selected one among the available bitmaps, it signals back to the gNB the bitmap used, by indicating the bitmap allocation index within the CG-UCI.

The options and techniques provided above are not exclusive to one another, such that various embodiments can employ one or more of the above options to map bitmap(s) or portions thereof to CG period(s), and some embodiments can employ multiple options discussed above (e.g., a first option to be applied in scenarios wherein X>P in conjunction with a second option to be employed when X<P, etc.).

Enhancements to the Rel-15 Allocation

In various embodiments, instead of employing a bitmap, the Rel-15 time-domain allocation approach (which is based on the parameters {periodicity, slot offset, SLIV, and repK}) can be enhanced by either reinterpreting some of these parameters and/or enabling new parameters to make for a more efficient time-domain allocation for the CG in NR-U operation. Due to the lack of continuous time-domain allocation within a periodicity when using the Rel-15 allocation, as well as multiple enabled channel access opportunities within the periodicity, various embodiments can employ enhancements that ensure that a UE can access the channel in multiple time resources (e.g., at multiple slot offsets, etc.), and that for each offset the configuration can enable multiple contiguous slots, depending on the available resources and periodicity.

In one embodiment, the UE can be configured with multiple slot offsets in the same manner as in the Rel-15 allocation. In some such embodiments, there can be a maximum number of slot offsets N, and a UE can be configured with n slot offsets ($K_{2,1}, \ldots, K_{2,n}$), n=1, ..., N, where $K_{2,i} \in \{0, \ldots, 5119\}$, i=1, ..., n. The value $K_{2,i}$ can be less than or equal to the periodicity P (P in units of slots). The duration of contiguous slots/mini-slots configured per offset can be given by a parameter z, where z<Z, where Z is the maximum allowable slot/mini-slot transmission duration (e.g., in situations wherein there is a Maximum Channel Occupancy Time (MCOT)); for example Z≤8 to allow the maximum configurable TB repetitions or allow 8 TB transmissions. In some embodiments, if the configured offsets in the periodicity are n, each with slot/mini-slot duration z, then nz<P, so that there are always slot/mini-slot gaps between transmissions within a periodicity. In some embodiments, n and z are defined as new parameters, while in other embodiments they can be accommodated by reinterpreting existing fields. In some embodiments, when the system operates on the unlicensed band, n and/or z can be signaled by reinterpreting one or more of the following parameters: periodicity, slot offset, SLIV, and repK, while when the system operates on the licensed band, then these parameters are interpreted as in Rel. 15 allocations.

In some embodiments, the UE can be configured through the use of two sequences that have the same length n (or via an equivalent sequence of pairs): one of these sequences can indicate n slot offsets ($K_{2,1}, \ldots, K_{2,n}$), n=1, ..., N, where $K_{2,i} \in \{0, \ldots, 5119\}$, i=1, ..., n, and the other sequence can indicate the consecutive number of resources that are allocated for a configured grant after the corresponding offset. In some embodiments, the number of resources can have a fixed granularity, or the granularity can be configured, for example, the granularity can be G∈{2 symbols, 7 symbols, 1 slot, 2 slots, 4 slots}. In some embodiments, the indication of the offset and consecutive resources can be jointly indicated by providing direct indication of the set of resources that are configured for configured grant operation, without decoupling this information into a set of offset and consecutive resources.

In one embodiment, offsets ($K_{2,1}, \ldots, K_{2,n}$), $K_{2,i} \neq K_{2,j}$ if i≠j can be configured such that they can indicate any slot offset within the periodicity, and indicate the slot offset with respect to the system frame number (SFN) when CG type 1 is used, and with respect to the activation DCI when using CG type 2. If the reference slot is slot m, then the UE can perform the LBT operation at slots m+$K_{2,i}$, i=1, ..., n, which will occur in the first periodicity of the CG activation. The allocation can repeat every periodicity after that until the CG is deactivated, so the UE can perform LBT to access the channel at slots m+$K_{2,i}$+lP l=1, ..., L, where L is the number of periodicities until the CG is deactivated.

In one embodiment, given a parameter z, which indicates the number of consecutive resources that are allocated for CG operation (e.g., slot duration of CG operation), that can have a value and/or granularity that can be fixed or configured through RRC signaling, a set of 5120-Z+1 resources (e.g., symbols, slots, etc.) can be formed. In some embodiments, 13 bits can be used to indicate via DCI one these set of resources. In some embodiment, multiple set of resources can be used, and can be configured via a bitmap (wherein the bitmap can be configured via RRC) that can indicate N elements of the set of resources. In some embodiments, given a bitmap which indicates multiple set of resources, T bits can be used in the DCI to indicate how many of the configured set of resources are utilized (e.g., indicating whether each of the first or last $2^T$ can be used, etc.). In some embodiments, the slot duration z can apply to the slot offset only when the UE has successfully passed LBT in the configured slot offset occasion. In other embodiments, the slot duration can be applied to all slot offsets, such that the UE can perform LBT on all consecutive LBT occasions with the slot duration for each slot offset. In some embodiments, the UE can attempt LBT to access the channel for each slot offset, but only transmit in one slot offset per periodicity once LBT succeeds. In other embodiments, the UE can use as many slot offsets as its UL traffic demands, regardless of periodicity.

Figure 8B:
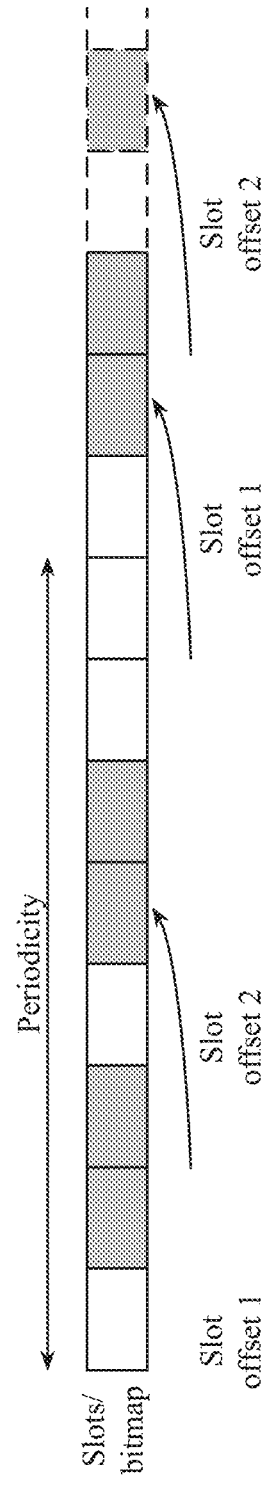
FIG. 8B is a diagram illustrating an example of multiple slot offsets configured within a periodicity, each with a duration of slots where the UE can perform its transmission contiguously in time, according to various embodiments discussed herein.

In some embodiments, the n slot offsets can be individually configured in the same manner as the Rel-15 signaling for the single slot offset. For CG type 1, the n slot offsets can be configured via RRC, and for CG type 2 the n slot offsets can be configured via 13 bits each via the DCI, such that the slot offsets can take any value integer from 0 to 5119. In one embodiment, the candidate slot offset positions with a periodicity are constrained to a smaller set of slots, such that the signaling required per each offset is reduced. The reduced set can be a function of the periodicity P, such that if maximum slot/mini-slot duration per offset is Z, then the slot offsets come from a total of M≤[5120/Z] total possible slot offsets. Referring to FIG. 8B, illustrated is a diagram showing an example of multiple slot offsets configured within a periodicity, each with a duration of slots where the UE can perform its transmission contiguously in time, according to various embodiments discussed herein. In various embodiments, the slot offset locations can be completely flexibly signaled using the legacy Rel-15 approach of an offset from 0 to 5119, or can come from a subset of the Rel-15 set of offsets.

In some embodiments, given a reference starting slot m (e.g., wherein slot refers to a full length slot or mini-slot), and given a value of z that indicates the number of consecutive resources to be used for CG operation, and a fixed offset value n, the resources within a period P can be configured so that slots m+n(i−1)+{0, ... z−1} can be used for configured grant transmission, where i=2, 3, ... K, and K is selected so that m+n(K−1)+z−1<P. In various embodiments, m, z, and n can be configured via RRC or can be indicated through DCI by either adding new fields or reinterpreting the existing fields.

In another embodiment, the slot offset locations can be deterministically derived (or fixed) from the legacy Rel-15 offset indicated in the CG activation, the periodicity P, and new parameters n and z, where n is the number of total configured slot offsets, and z is the transmission slot/mini-slot duration. For example, one possible function can be derived if the Rel-15 slot offset indicates a slot $K_2$ from the beginning of the periodicity, then the slot offsets must be such that there is a gap between the each slot offsets of at least $K_2+z$, so that the number of offsets for this periodicity, initial slot offset, and transmission duration z can be configured such that $$n \le \min\left\{\frac{P}{K_2 + z}, N\right\}.$$

However, since the gap of $K_2+z$ may be too short given large periodicities and the maximum number of slot offsets per periodicity, in various embodiments, there can be an additional slot gap g that is added at the end of the slot/mini-slot transmission duration. Thus, in such embodiments, the slot offsets can occur at slots {$K_2$, (I−1)($K_2$+z+g)}, i=2, ..., n, and the gap can be determined as $$g = \left\lfloor \frac{P - n(K_2 + z)}{n} \right\rfloor.$$

FIG. 8A illustrates one specific example of such an embodiment, with $K_2$=1, z=2, n=2, and g=1.

In another embodiment, the slot offsets can be emulated via a bitmap that can configure certain slots via a bitmap of length X and bitmap time granularity y within a periodicity. For example, the bitmap can enable or disable slots/mini-slots in granularity of y, where the granularity y can be determined by X and P. In the case of short periodicities (e.g., 2OS, 7OS, 1 slot, etc.), the bitmap granularity can be constrained in some embodiments to be such it fits the service/traffic type, and only the first $X_1$ bits of the bitmap are used for the offsets, while the remaining $X-X_1$ bits are set to zero. In the case of long periodicities, such that the bitmap signaling duration is shorter than the periodicity, in such embodiments the bitmap indication can simply repeat until it covers the entire duration of the periodicity. Additionally, other options and/or techniques discussed herein in connection with bitmaps can be employed.

In some embodiments, the offset and duration can be provided through two distinct bitmaps/sequences which can have the same length and can be configured through RRC.

In some embodiments, X bits can be introduced within the DCI in order to signal, a specific element, or the first or last $2^X-1$ elements or group of elements contained in the RRC sequences to use within a period P for configured grant transmission. In some embodiments, the value of X can determine the specific elements of the RRC sequences which are used, such as in the following examples.

In some example embodiments, one element can be signaled. In one example, given RRC sequences comprising the following elements: n=[3,9,24,36,96,107,156,200]; z=[2,3,5,2,9,10,2,8], and given 3 bits in the DCI, these three bits can indicate which value of n or z to use;

In some example embodiments, the first (or last) $2^X-1$ elements can be signaled. In one example, given RRC sequences comprising the following elements: n=[3,9,24,36, 96,107,156,200]; z=[2,3,5,2,9,10,2,8], and given X (e.g., 3 in the following example) bits in the DCI, these three bits will indicate the first m elements to use. For instance, if X=001, then only n={3} and m={2} is used; if X=011, then n={3,9,24}, and m={2,3,5} are used (the last $2^X-1$ elements can be indicated in a similar manner).

In some example embodiments, a group of elements can be signaled. In one example, a look-up table (LUT) can be formed, and every element of X can correspond to a specific group of element of n and z via the LUT.

In some embodiments, a CG UE can have a table, where each entry in the table can be associated with an offset configuration, where the slot offset configuration table can contain one offset format, wherein each offset format can correspond to one (or a combination) of the different embodiments discussed herein, etc. In one example of such embodiments, in the entry of the table with index j, the UE can be configured with n(j) slot offsets, and slot/mini-slot duration z(j), and these offsets and slot duration can be configured by higher layers. In another example of such embodiments, the entry in index j of the table can have slot offsets $\{K_{2,1}(j), \ldots, K_{2,n}(j)\}$, where the total number of slot offsets n(j) may different in each entry j. In some embodiments, each slot offset configuration in the table can have a sequence of slot offsets and associated sequence of slot/min-slot durations $\{z_1(j), \ldots, z_{n(j)}(j)\}$. In some embodiments, the table can be configured with slot bitmaps that indicate enabled or disabled slots/mini-slots, and a bitmap granularity parameter. In one example of such embodiments, the bitmap in table index j can be the vector x(j) of length X(j), and the granularity can be y(j). In some embodiments, the total number of entries in the table can be M (e.g. with M some power of 2 (e.g., M=16) or other integer), and the CG activation can signal one of the offset configurations using $[\log_2 M]$ bits. In some embodiments, the UE can be configured in its CG activation with an index from its table to indicate the slot offset(s) to use, wherein it can be configured by RRC for CG type 1, and by the gNB in the DCI activation for CG type 2. In other embodiments, the UE can select an index from the table autonomously according to its current traffic demands, and can indicates the slot offset configuration used in the CG-UCI (Uplink Control Information).

In some embodiments, multiple legacy Rel-15 configurations can be supported (and/or duplicated), wherein each can support a specific service/traffic, and each can be associated with an independent activation and deactivation.

In various embodiments, one or a combination of the features, techniques, and/or options discussed herein can be used to implement the time-domain allocation for a CG UE using the unlicensed operation of NR.

ADDITIONAL EXAMPLES

Figure 9:
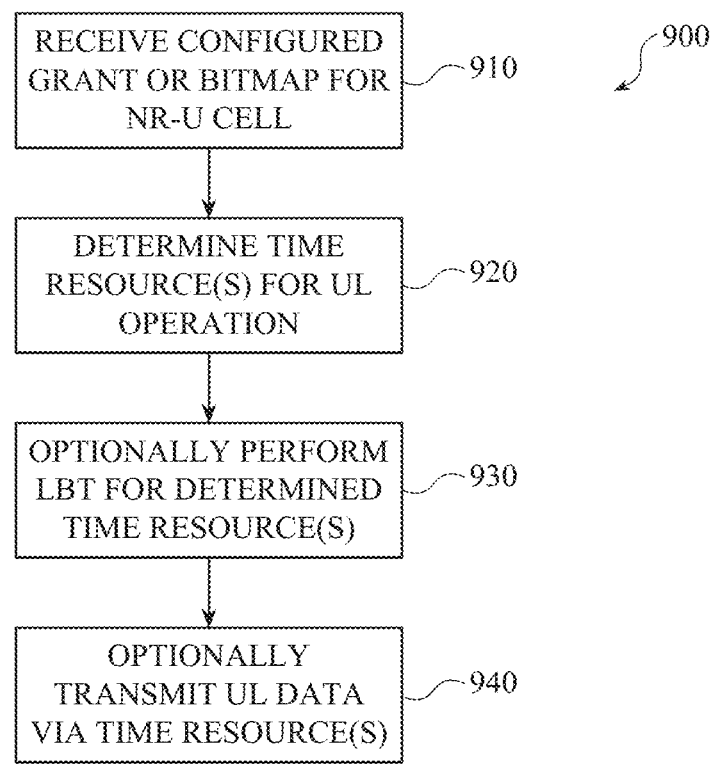
FIG. 9 is a flow diagram illustrating an example method employable at UE that facilitates NR-U operation based on one or more configured time resources for UL transmission, according to various embodiments discussed herein.

Referring to FIG. 9, illustrated is a flow diagram of an example method 900 employable at a UE that facilitates NR-U operation based on one or more configured time resources for UL transmission, according to various embodiments discussed herein. In other aspects, a machine readable medium can store instructions associated with method 900 that, when executed, can cause a UE to perform the acts of method 900.

At 910, a Configured Grant (CG) and/or a bitmap can be received associated with Uplink (UL) operation on a NR unlicensed cell.

At 920, one or more time resources for UL operation can be determined based on the CG and/or bitmap.

At 930, optionally (e.g., if the UE has UL data to transmit), the UE can perform a LBT operation in connection with at least one of the one or more time resources to determine if the unlicensed cell is clear for UL transmission.

At 940, optionally (e.g., if the UE has UL data to transmit and the unlicensed cell is clear for UIL transmission), the UE can transmit UL data via the at least one of the one or more time resources.

Additionally or alternatively, method 900 can include one or more other acts described herein.

Examples herein can include subject matter such as a method, means for performing acts or blocks of the method, at least one machine-readable medium including executable instructions that, when performed by a machine (e.g., a processor with memory (e.g., of device/apparatus 200, 300, 400, etc.), an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed in a User Equipment (UE), comprising: one or more processors configured to: process at least one bitmap via Radio Resource Control (RRC) signaling, wherein each bitmap of the at least one bitmap comprises X bits, wherein X is an integer greater than one; and determine, based at least on the at least one bitmap, for each time resource of at least one Configured Grant (CG) period, whether that time resource is configured for Uplink (UL) transmission via an unlicensed carrier, wherein each CG period of the at least one CG period comprises P time resources, wherein P is an integer greater than one.

Example 2 comprises the subject matter of any variation of any of example(s) 1, wherein the one or more processors are further configured to, for a first time resource determined to be configured for UL transmission via the unlicensed carrier, make a determination whether the unlicensed carrier is clear via a Listen Before Talk (LBT) procedure.

Example 3 comprises the subject matter of any variation of any of example(s) 2, wherein, in response to a determination that the unlicensed carrier is clear, the one or more processors are further configured to generate UL data for transmission via the first time resource.

Example 4 comprises the subject matter of any variation of any of example(s) 1-3, wherein each bit of the X bits indicates, for an associated time resource of the at least one CG period, whether the associated time resource is configured for UL transmission via the unlicensed carrier.

Example 5 comprises the subject matter of any variation of any of example(s) 1-4, wherein each time resource of the at least one CG period has a size based on a granularity indicated via one of higher layer signaling or Downlink Control Information (DCI), wherein the size is one of two Orthogonal Frequency Division Multiplexing (OFDM) symbols, 7 OFDM symbols, a slot, a subframe, or a radio frame.

Example 6 comprises the subject matter of any variation of any of example(s) 1-5, wherein X is independent of a subcarrier spacing of the unlicensed carrier.

Example 7 comprises the subject matter of any variation of any of example(s) 1-5, wherein X is based at least in part on a subcarrier spacing of the unlicensed carrier.

Example 8 comprises the subject matter of any variation of any of example(s) 1-7, wherein X is configured via one of RRC or Downlink Control Information (DCI).

Example 9 comprises the subject matter of any variation of any of example(s) 1-7, wherein the at least one bitmap is at least one identical bitmap repeated over the at least one CG period, wherein X is independent of P.

Example 10 comprises the subject matter of any variation of any of example(s) 1-7, wherein the at least one bitmap is a single bitmap, and wherein, when X is greater than P, each of the first P bits of the single bitmap indicates whether an associated time resource of each CG period of the at least one CG period is configured for UL transmission via the unlicensed carrier.

Example 11 comprises the subject matter of any variation of any of example(s) 1-7, wherein the at least one bitmap is a single bitmap, wherein the at least one CG period is n CG periods for an integer n greater than one, and wherein, when X is greater than (n−1)×P and less than nP for an integer n greater than one, whether each time resource of each CG period of the n CG periods is configured for UL transmission via the unlicensed carrier is indicated via an associated bit of the single bitmap followed by the first nP−X bits of the single bitmap.

Example 12 comprises the subject matter of any variation of any of example(s) 1-7, wherein the at least one bitmap is n bitmaps for an integer n greater than one, wherein the at least one CG period is a single CG period, and wherein, when P is greater than (n−1)×X and less than nX for an integer n greater than one, whether each time resource of the single CG period is configured for UL transmission via the unlicensed carrier is indicated via an associated bit of a first n−1 bitmaps of the n bitmaps followed by the first nX−P bits of the nth bitmap of the n bitmaps.

Example 13 comprises the subject matter of any variation of any of example(s) 1-7, wherein the at least one bitmap is a single bitmap and the at least one CG period is a single CG period, wherein, when P is greater than X, each of the X bits of the single bitmap indicates whether an associated time resource of the single CG period is configured for UL transmission via the unlicensed carrier, and wherein one or more additional time resources of the single CG period without an associated bit of the single bitmap are not configured for UL transmission via the unlicensed carrier.

Example 14 comprises the subject matter of any variation of any of example(s) 1-7, wherein, when P is greater than X, the at least one bitmap is two or more bitmaps, wherein a second bitmap of the two or more bitmaps is cyclically shifted relative to a first bitmap of the two or more bitmaps.

Example 15 comprises the subject matter of any variation of any of example(s) 14, wherein each bitmap of the two or more bitmaps other than the first bitmap is cyclically shifted relative to the first bitmap by a common offset.

Example 16 comprises the subject matter of any variation of any of example(s) 14, wherein the one or more processors are further configured to determine, for each bitmap of the two or more bitmaps other than the first bitmap, a cyclic shift for that bitmap relative to the first bitmap, based on at least one of RRC signaling, a Downlink Control Information (DCI) message, or a locally stored table.

Example 17 is a UE comprising the apparatus of any of examples 1-16.

Example 18 is a machine-readable medium comprising instructions that, when executed, cause a User Equipment (UE) to: process at least one bitmap via Radio Resource Control (RRC) signaling, wherein each bitmap of the at least one bitmap comprises X bits, wherein X is an integer greater than one; and determine, based at least on the at least one bitmap, for each time resource of at least one Configured Grant (CG) period, whether that time resource is configured for Uplink (UL) transmission via an unlicensed carrier, wherein each CG period of the at least one CG period comprises P time resources, wherein P is an integer greater than one.

Example 19 comprises the subject matter of any variation of any of example(s) 18, wherein the instructions, when executed, further cause the UE to, for a first time resource determined to be configured for UL transmission via the unlicensed carrier, make a determination whether the unlicensed carrier is clear via a Listen Before Talk (LBT) procedure.

Example 20 comprises the subject matter of any variation of any of example(s) 19, wherein, in response to a determination that the unlicensed carrier is clear, the instructions, when executed, further cause the UE to generate UL data for transmission via the first time resource.

Example 21 comprises the subject matter of any variation of any of example(s) 18-20, wherein each bit of the X bits indicates, for an associated time resource of the at least one CG period, whether the associated time resource is configured for UL transmission via the unlicensed carrier.

Example 22 comprises the subject matter of any variation of any of example(s) 18-21, wherein each time resource of the at least one CG period has a size based on a granularity indicated via one of higher layer signaling or Downlink Control Information (DCI), wherein the size is one of two Orthogonal Frequency Division Multiplexing (OFDM) symbols, 7 OFDM symbols, a slot, a subframe, or a radio frame.

Example 23 comprises the subject matter of any variation of any of example(s) 18-22, wherein X is independent of a subcarrier spacing of the unlicensed carrier.

Example 24 comprises the subject matter of any variation of any of example(s) 18-22, wherein X is based at least in part on a subcarrier spacing of the unlicensed carrier.

Example 25 comprises the subject matter of any variation of any of example(s) 18-24, wherein X is configured via one of RRC or Downlink Control Information (DCI).

Example 26 comprises the subject matter of any variation of any of example(s) 18-24, wherein the at least one bitmap is at least one identical bitmap repeated over the at least one CG period, wherein X is independent of P.

Example 27 comprises the subject matter of any variation of any of example(s) 18-24, wherein the at least one bitmap is a single bitmap, and wherein, when X is greater than P, each of the first P bits of the single bitmap indicates whether an associated time resource of each CG period of the at least one CG period is configured for UL transmission via the unlicensed carrier.

Example 28 comprises the subject matter of any variation of any of example(s) 18-24, wherein the at least one bitmap is a single bitmap, wherein the at least one CG period is n CG periods for an integer n greater than one, and wherein, when X is greater than (n−1)×P and less than nP for an integer n greater than one, whether each time resource of each CG period of the n CG periods is configured for UL transmission via the unlicensed carrier is indicated via an associated bit of the single bitmap followed by the first nP−X bits of the single bitmap.

Example 29 comprises the subject matter of any variation of any of example(s) 18-24, wherein the at least one bitmap is n bitmaps for an integer n greater than one, wherein the at least one CG period is a single CG period, and wherein, when P is greater than (n−1)×X and less than nX for an integer n greater than one, whether each time resource of the single CG period is configured for UL transmission via the unlicensed carrier is indicated via an associated bit of a first n−1 bitmaps of the n bitmaps followed by the first nX−P bits of the nth bitmap of the n bitmaps.

Example 30 comprises the subject matter of any variation of any of example(s) 18-24, wherein the at least one bitmap is a single bitmap and the at least one CG period is a single CG period, wherein, when P is greater than X, each of the X bits of the single bitmap indicates whether an associated time resource of the single CG period is configured for UL transmission via the unlicensed carrier, and wherein one or more additional time resources of the single CG period without an associated bit of the single bitmap are not configured for UL transmission via the unlicensed carrier.

Example 31 comprises the subject matter of any variation of any of example(s) 18-24, wherein, when P is greater than X, the at least one bitmap is two or more bitmaps, wherein a second bitmap of the two or more bitmaps is cyclically shifted relative to a first bitmap of the two or more bitmaps.

Example 32 comprises the subject matter of any variation of any of example(s) 31, wherein each bitmap of the two or more bitmaps other than the first bitmap is cyclically shifted relative to the first bitmap by a common offset.

Example 33 comprises the subject matter of any variation of any of example(s) 31, wherein the instructions, when executed, further cause the UE to determine, for each bitmap of the two or more bitmaps other than the first bitmap, a cyclic shift for that bitmap relative to the first bitmap, based on at least one of RRC signaling, a Downlink Control Information (DCI) message, or a locally stored table.

Example 34 is an apparatus configured to be employed in a User Equipment (UE), comprising: one or more processors configured to: process a Configured Grant (CG) for an unlicensed carrier via one of Radio Resource Control (RRC) or Downlink Control Information (DCI); and determine, based at least on the CG, one or more time resources configured for Uplink (UL) transmission via the unlicensed carrier.

Example 35 comprises the subject matter of any variation of any of example(s) 34, wherein the one or more processors are further configured to make a determination whether the unlicensed carrier is clear via a Listen Before Talk (LBT) procedure for a first time resource of the one or more time resources.

Example 36 comprises the subject matter of any variation of any of example(s) 35, wherein, in response to a determination that the unlicensed carrier is clear, the one or more processors are further configured to generate UL data for transmission via the first time resource.

Example 37 comprises the subject matter of any variation of any of example(s) 34-36, wherein the configured grant comprises one or more parameters, and wherein the one or more processors are configured to determine the one or more time resources based at least on the one or more parameters.

Example 38 comprises the subject matter of any variation of any of example(s) 37, wherein the one or more parameters comprise one or more of a periodicity, a slot offset, a starting symbol and length indicator value (SLIV), or a number of repetitions (repK).

Example 39 comprises the subject matter of any variation of any of example(s) 38, wherein the one or more parameters comprise the periodicity, the slot offset, the SLIV, and the repK.

Example 40 comprises the subject matter of any variation of any of example(s) 34-39, wherein the CG indicates a plurality of slot offsets and a duration of contiguous slots that applies to each slot offset of the plurality of slot offsets, wherein the one or more processors are configured to determine the one or more time resources based at least on the plurality of slot offsets and the duration of contiguous slots.

Example 41 comprises the subject matter of any variation of any of example(s) 40, wherein the plurality of slot offsets are evenly spaced in time during a CG period.

Example 42 comprises the subject matter of any variation of any of example(s) 34-39, wherein the CG indicates a plurality of slot offsets and an associated consecutive number of resources for each slot offset of the plurality of slot offsets, wherein the one or more processors are configured to determine the one or more time resources based at least on the plurality of slot offsets and the associated consecutive number of resources for each slot offset of the plurality of slot offsets.

Example 43 comprises the subject matter of any variation of any of example(s) 42, wherein the associated consecutive number of resources for each slot offset of the plurality of slot offsets has a granularity in time resources that is one of fixed or configured, wherein the granularity is one of two Orthogonal Frequency Division Multiplexing (OFDM) symbols, 7 OFDM symbols, a slot, two slots, or four slots.

Example 44 comprises the subject matter of any variation of any of example(s) 34-39, wherein the CG indicates the one or more time resources via indicating one or more sets of resources, wherein the one or more sets are one of fixed or configured.

Example 45 comprises the subject matter of any variation of any of example(s) 44, wherein the CG is processed via DCI, and wherein the CG indicates the one or more sets of resources via 13 bits.

Example 46 comprises the subject matter of any variation of any of example(s) 44, wherein the CG indicates the one or more sets of resources via a bitmap, wherein each set of resources of the one or more sets of resources is associated with a distinct bit of the bitmap.

Example 47 comprises the subject matter of any variation of any of example(s) 34-39, wherein the CG indicates a plurality of slot offsets that are evenly spaced in time during a CG period, each of which has a fixed duration, and wherein the one or more processors are configured to determine the one or more time resources based at least on the plurality of slot offsets and the fixed duration.

Example 48 comprises the subject matter of any variation of any of example(s) 34-39, wherein the one or more time resources have a total duration less than a CG period.

Example 49 comprises the subject matter of any variation of any of example(s) 34-39, wherein the one or more processors are configured to determine the one or more time resources based at least on an entry in a locally stored table, wherein the entry is determined based at least on the CG.

Example 50 is a UE comprising the apparatus of any of examples 34-49.

Example 51 is a machine-readable medium comprising instructions that, when executed, cause a User Equipment (UE) to: process a Configured Grant (CG) for an unlicensed carrier via one of Radio Resource Control (RRC) or Downlink Control Information (DCI); and determine, based at least on the CG, one or more time resources configured for Uplink (UL) transmission via the unlicensed carrier.

Example 52 comprises the subject matter of any variation of any of example(s) 51, wherein the instructions, when executed, further cause the UE to make a determination whether the unlicensed carrier is clear via a Listen Before Talk (LBT) procedure for a first time resource of the one or more time resources.

Example 53 comprises the subject matter of any variation of any of example(s) 52, wherein, in response to a determination that the unlicensed carrier is clear, the instructions, when executed, further cause the UE to generate UL data for transmission via the first time resource.

Example 54 comprises the subject matter of any variation of any of example(s) 51-53, wherein the configured grant comprises one or more parameters, and wherein the instructions, when executed, cause the UE to determine the one or more time resources based at least on the one or more parameters.

Example 55 comprises the subject matter of any variation of any of example(s) 54, wherein the one or more parameters comprise one or more of a periodicity, a slot offset, a starting symbol and length indicator value (SLIV), or a number of repetitions (repK).

Example 56 comprises the subject matter of any variation of any of example(s) 55, wherein the one or more parameters comprise the periodicity, the slot offset, the SLIV, and the repK.

Example 57 comprises the subject matter of any variation of any of example(s) 51-56, wherein the CG indicates a plurality of slot offsets and a duration of contiguous slots that applies to each slot offset of the plurality of slot offsets, wherein the instructions, when executed, cause the UE to determine the one or more time resources based at least on the plurality of slot offsets and the duration of contiguous slots.

Example 58 comprises the subject matter of any variation of any of example(s) 57, wherein the plurality of slot offsets are evenly spaced in time during a CG period.

Example 59 comprises the subject matter of any variation of any of example(s) 51-56, wherein the CG indicates a plurality of slot offsets and an associated consecutive number of resources for each slot offset of the plurality of slot offsets, wherein the instructions, when executed, cause the UE to determine the one or more time resources based at least on the plurality of slot offsets and the associated consecutive number of resources for each slot offset of the plurality of slot offsets.

Example 60 comprises the subject matter of any variation of any of example(s) 59, wherein the associated consecutive number of resources for each slot offset of the plurality of slot offsets has a granularity in time resources that is one of fixed or configured, wherein the granularity is one of two Orthogonal Frequency Division Multiplexing (OFDM) symbols, 7 OFDM symbols, a slot, two slots, or four slots.

Example 61 comprises the subject matter of any variation of any of example(s) 51-56, wherein the CG indicates the one or more time resources via indicating one or more sets of resources, wherein the one or more sets are one of fixed or configured.

Example 62 comprises the subject matter of any variation of any of example(s) 61, wherein the CG is processed via DCI, and wherein the CG indicates the one or more sets of resources via 13 bits.

Example 63 comprises the subject matter of any variation of any of example(s) 61, wherein the CG indicates the one or more sets of resources via a bitmap, wherein each set of resources of the one or more sets of resources is associated with a distinct bit of the bitmap.

Example 64 comprises the subject matter of any variation of any of example(s) 51-56, wherein the CG indicates a plurality of slot offsets that are evenly spaced in time during a CG period, each of which has a fixed duration, and wherein the instructions, when executed, cause the UE determine the one or more time resources based at least on the plurality of slot offsets and the fixed duration.

Example 65 comprises the subject matter of any variation of any of example(s) 51-56, wherein the one or more time resources have a total duration less than a CG period.

Example 66 comprises the subject matter of any variation of any of example(s) 51-56, wherein the instructions, when executed, cause the UE to determine the one or more time resources based at least on an entry in a locally stored table, wherein the entry is determined based at least on the CG.

Example 67 comprises an apparatus comprising means for executing any of the described operations of examples 1-66.

Example 68 comprises a machine readable medium that stores instructions for execution by a processor to perform any of the described operations of examples 1-66.

Example 69 comprises an apparatus comprising: a memory interface; and processing circuitry configured to: perform any of the described operations of examples 1-66.

The following are additional example embodiments.

Example A1 may include a method comprising: configuring time-domain allocation for a UE using a CG operation in an NR unlicensed spectrum.

Example A2 may include the method of example A1 or some other example, further comprising interpreting the configured time domain allocation based on a configured periodicity or other Rel-15 parameters.

Example A3 may include the method of example A1 or some other example herein, further comprising configuring time-domain resources through RRC signaling via a bitmap.

Example A4 may include the method of example A3 or some other example herein, wherein the bitmap is composed by X bits, where each bit corresponds to a symbol/slot/mini-slot/subframe or radio frame.

Example A5 may include the method of example A4 or some other example herein, wherein the value of X is the same regardless of the subcarrier spacing (SCS) used.

Example A6 may include the method of example A4 or some other example herein, wherein the value of X is scaled based on subcarrier spacing: for example, X=40 bits for 15 KHz SCS, X=80 bits for 30 KHz SCS, or X=160 bits for 60 KHz SCS.

Example A7 may include the method of example A4 or some other example herein, where X can be configured by higher layers or the by the gNB via DCI, independent of SCS.

Example A8 may include the method of example A1 or some other example herein, where a granularity parameter G can scale with SCS, or it can be configured independently by higher layers, or by the gNB via DCI.

Example A9 may include the method of example A4 or some other example herein, wherein regardless of the CG periodicity used, the bitmap is repeated, and its value is interpreted accordingly.

Example A10 may include the method of example A4 or some other example herein, wherein if the length in time resource units of each periodicity value is smaller than the corresponding length of the bitmap X using the same time resource units, for each period, the first P time unit resources of the bitmap are used.

Example A11 may include the method of example A4 or some other example herein, wherein if the length in time resource units of each periodicity value is smaller than the corresponding length of the bitmap X using the same time resource units, for the each group of time-domain resources which are covered by n periods, where n is such that nxP=X or (nxP>X and (n−1)×P<X), the bitmap X is used, and the spare resources that are not covered by the length of the bitmap within the last period are configured using the first (nP−X) time domain configuration of the bitmap.

Example A12 may include the method of example A4 or some other example herein, wherein if the length in time resource units of each period value is larger than the corresponding length of the bitmap X using the same time resource units, for the each period the first time-domain resources are configured as for the bitmap, while the remaining one are configured by repeating in time the bitmap up to the end of the period.

Example A13 may include the method of example A4 or some other example herein, if the length in time resource units of each period value is larger than the corresponding length of the bitmap X using the same time resource units, the first X resource units within a period are configured following the bitmap, while the remaining resources within a period are not used for configured grant transmission.

Example A14 may include the method of example A4 or some other example herein, wherein the bitmap X and the repetition Y can be configured, where X resource units are repeated by Y times for allocating configured grant resource in the beginning of a period, while the remaining resources within the period are not used for configured grant transmission.

Example A15 may include the method of example A4 or some other example herein, wherein in order to increase flexibility in the way how the time domain resources are configured when a bitmap is used, and the period is larger than the X, the bitmap is repeated using a cyclic shift with offset (e.g., as illustrated in FIG. 5).

Example A16 may include the method of example A15 or some other example herein, whereon the offset is the same for all the repetitions. In one embodiment, the offset is different for each repetition.

Example A17 may include the method of example A15 or some other example herein, wherein L=0 for the first bitmap, and then a common or a different offset is used.

Example A18 may include the method of example A17 or some other example herein, wherein the offset value(s) is (are) carried in a different RRC parameter. In one embodiment, the offset value(s) is (are) carried together with the bitmap: this is done by enhancing the bitmap from X to X+M bits, where M are either the MSB or LSB bits of the bitmap, and they are used to signal the offset.

Example A19 may include the method of example A15 or some other example herein, where the UE contains multiple bitmap configurations, and the index of the configuration is either signaled to the UE via higher layers or gNB in the DCI activation, or the UE selects it and signals the index to the gNB via the CG-UCI.

Example A20 may include the method of example A1 or some other example herein, where the UE's time-domain allocation is based on the Rel-15 allocation, using {periodicity, slot offset, SLIV, and repK}.

Example A21 may include the method of example A20 or some other example herein, where the time-domain allocation configuration provides the UE with multiple slot offsets within the configured periodicity.

Example A22 may include the method of example A21 or some other example herein, where the maximum number N of configurable slot offsets is fixed, and the UE can be assigned any number of slot offsets between 1 and N.

Example A23 may include the method of example A21 or some other example herein, where a transmission duration parameter z indicates the number of consecutive slots/min-slots that a UE can attempt a transmission, beginning in the slot indicated by any one of the slot offsets.

Example A24 may include the method of example A23 or some other example herein, where the duration parameter can be either a reinterpretation of a Rel-15 parameter, such as repK, or a newly defined parameter that is not in Rel-15.

Example A25 may include the method of examples A23 or some other example herein, where the parameter z may be constant across all slot offsets, or may be configured differently for each slot offset.

Example A26 may include the method of example A22 or some other example herein, where the slot offsets are each individually signaled in the same manner as the slot offset in the Rel-15 slot offset signaling.

Example A27 may include the method of examples A20-A22 or some other example herein, where the slot offsets are signaled from a subset of the Rel-15 set of slot offsets.

Example A28 may include the method of examples A20-A22 or some other example herein, where the slot offsets are derived as a function of one slot offset indication, the duration parameter z, the periodicity, the selected number of slot offsets n, and any other parameters that can affect the slot offset positions.

Example A29 may include the method of example A27 or some other example herein, where the parameters can be Rel-15 parameters or new parameters.

Example A30 may include the method of examples A20-A22 or some other example herein, where the offsets occur evenly spaced, and with a fixed slot duration per offset.

Example A31 may include the method of examples A20-A22 or some other example herein, where the offsets are emulated by a bitmap, which indicates which time resources within a periodicity are enabled.

Example A32 may include the method of example A30 or some other example herein, where the bitmap may be of length proportional to the periodicity, or may be fixed regardless of the periodicity.

Example A33 may include the methods of example A32 or some other example herein, where a bitmap of length X points to an allocation table of length 2X−1, such that the slot/mini-slot allocation length is of length up to 2X−1.

Example A34 may include the method of example A23 or some other example herein, where the slot offset positions and durations are each signaled in separate sequences, such that the corresponding indices form a pair.

Example A35 may include the method of example A23 or some other example herein, where the aggregate of the slot offsets and durations is always less than the total slots in the periodicity.

Example A36 may include the method of example A23 or some other example herein, where the slot offsets in the first periodicity are with respect to a reference slot, and the same slot offset allocation pattern within the first periodicity repeats itself for all subsequent periodicities until the CG is deactivated via RRC for type 1 or DCI for type 2.

Example A37 may include the method of example A27 or some other example herein, where the subset is derived from the subset of the Rel-15 slot offsets set is derived from the parameters, such as slot duration, etc.

Example A38 may include the methods of example A37 or some other example herein, where each UE has a slot configuration table, such that multiple slot offset configurations can be assigned to a UE, one per table index.

Example A39 may include the method of example A38 or some other example herein, where the index of the table is signaled to the UE via RRC for CG type 1, or by the gNB via the activation DCI for CG type 2.

Example A40 may include the method of example A38 or some other example herein, where the UE autonomously selects the configuration from its table of slot offset configurations, and signals the index of the configuration used to the gNB via the CG-UCI.

Example Z01 may include an apparatus comprising means to perform one or more elements of a method described in or related to any of examples A1-A40, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples A1-A40, or any other method or process described herein.

Example Z03 may include an apparatus comprising logic, modules, or circuitry to perform one or more elements of a method described in or related to any of examples A1-A40, or any other method or process described herein.

Example Z04 may include a method, technique, or process as described in or related to any of examples A1-A40, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples A1-A40, or portions thereof.

Example Z06 may include a signal as described in or related to any of examples A1-A40, or portions or parts thereof.

Example Z07 may include a datagram, packet, frame, segment, protocol data unit (PDU), or message as described in or related to any of examples A1-A40, or portions or parts thereof, or otherwise described in the present disclosure.

Example Z08 may include a signal encoded with data as described in or related to any of examples A1-A40, or portions or parts thereof, or otherwise described in the present disclosure.

Example Z09 may include a signal encoded with a datagram, packet, frame, segment, protocol data unit (PDU), or message as described in or related to any of examples A1-A40, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples A1-A40, or portions thereof.

Example Z11 may include a computer program comprising instructions, wherein execution of the program by a processing element is to cause the processing element to carry out the method, techniques, or process as described in or related to any of examples A1-A40, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A baseband processor of a User Equipment (UE), comprising:
    a memory; and
    one or more processors coupled to the memory, and configured to:
        process a Configured Grant (CG) for an unlicensed carrier via one of Radio Resource Control (RRC) or Downlink Control Information (DCI), wherein the CG indicates a plurality of slot offsets and a duration of contiguous slots that applies to each slot offset of the plurality of slot offsets; and
        determine, based at least on, the plurality of slot offsets, and the duration of contiguous slots, one or more time resources configured for Uplink (UL) transmission via the unlicensed carrier.

2. The baseband processor of claim 1, wherein the configured grant comprises one or more parameters, and wherein the one or more processors are configured to determine the one or more time resources based at least on the one or more parameters, wherein the one or more parameters include one or more of a periodicity, a slot offset, a starting symbol and length indicator value (SLIV), or a number of repetitions (repK).

3. The baseband processor of claim 1, wherein the CG indicates an associated consecutive number of resources for each slot offset of the plurality of slot offsets, wherein the one or more processors are configured to determine the one or more time resources based at least on the associated consecutive number of resources for each slot offset of the plurality of slot offsets.

4. The baseband processor of claim 1, wherein the CG indicates the one or more time resources via indicating one or more sets of resources, wherein the one or more sets of resources are one of fixed or configured, wherein the CG is processed via DCI; and
   wherein the CG indicates the one or more sets of resources via 13 bits.

5. The baseband processor of claim 1, wherein the plurality of slot offsets are evenly spaced in time during a CG period, wherein the duration of contiguous slots is .

6. The baseband processor of claim 1, wherein the one or more processors are further configured to make a determination whether the unlicensed carrier is clear via a Listen Before Talk (LBT) procedure for a first time resource of the one or more time resources.

7. The baseband processor of claim 6, wherein, in response to the determination that the unlicensed carrier is clear, the one or more processors are further configured to generate UL data for transmission via the first time resource.

8. The baseband processor of claim 1, wherein the plurality of slot offsets are evenly spaced in time during a CG period.

9. The baseband processor of claim 3, wherein the associated consecutive number of resources for each slot offset of the plurality of slot offsets has a granularity in time resources that is one of fixed or configured, wherein the granularity is one of two Orthogonal Frequency Division Multiplexing (OFDM) symbols, 7 OFDM symbols, a slot, two slots, or four slots.

10. A user equipment (UE) comprising:
   a radio front end; and
   one or more processors coupled to the radio front end, and configured to:
      process a Configured Grant (CG) for an unlicensed carrier via one of Radio Resource Control (RRC) or Downlink Control Information (DCI), wherein the CG indicates a plurality of slot offsets and a duration of contiguous slots that applies to each slot offset of the plurality of slot offsets; and
      determine, based at least on, the plurality of slot offsets, and the duration of contiguous slots, one or more time resources configured for Uplink (UL) transmission via the unlicensed carrier.

11. The UE of claim 10, wherein the configured grant comprises one or more parameters, and wherein the one or more processors are configured to determine the one or more time resources based at least on the one or more parameters, wherein the one or more parameters include one or more of a periodicity, a slot offset, a starting symbol and length indicator value (SLIV), or a number of repetitions (repK).

12. The UE of claim 10, wherein the CG indicates an associated consecutive number of resources for each slot offset of the plurality of slot offsets, wherein the one or more processors are configured to determine the one or more time resources based at least on the associated consecutive number of resources for each slot offset of the plurality of slot offsets.

13. The UE of claim 10, wherein the CG indicates the one or more time resources via indicating one or more sets of resources, wherein the one or more sets of resources are one of fixed or configured, wherein the CG is processed via DCI; and
   wherein the CG indicates the one or more sets of resources via 13 bits.

14. The UE of claim 10, wherein the plurality of slot offsets are evenly spaced in time during a CG period, wherein the duration of contiguous slots is.

15. The UE of claim 10, wherein the one or more processors are further configured to make a determination whether the unlicensed carrier is clear via a Listen Before Talk (LBT) procedure for a first time resource of the one or more time resources.

16. A method for a user equipment (UE), the method comprising:
   processing a Configured Grant (CG) for an unlicensed carrier via one of Radio Resource Control (RRC) or Downlink Control Information (DCI), wherein the CG indicates a plurality of slot offsets and a duration of contiguous slots that applies to each slot offset of the plurality of slot offsets; and
   determining, based at least on, the plurality of slot offsets, and the duration of contiguous slots, one or more time resources configured for Uplink (UL) transmission via the unlicensed carrier.

17. The method of claim 16, wherein the configured grant comprises one or more parameters, and wherein the method further comprises:
   determining the one or more time resources based at least on the one or more parameters, wherein the one or more parameters include one or more of a periodicity, a slot offset, a starting symbol and length indicator value (SLIV), or a number of repetitions (repK).

18. The method of claim 16, wherein the CG indicates an associated consecutive number of resources for each slot offset of the plurality of slot offsets, wherein the method further comprises:
   determining the one or more time resources based at least on the associated consecutive number of resources for each slot offset of the plurality of slot offsets.

19. The method of claim 16, wherein the CG indicates the one or more time resources via indicating one or more sets of resources, wherein the one or more sets of resources are one of fixed or configured, wherein the CG is processed via DCI; and
   wherein the CG indicates the one or more sets of resources via 13 bits.

20. The method of claim 16, wherein the plurality of slot offsets are evenly spaced in time during a CG period, wherein the duration of contiguous slots is.

* * * * *